(12) United States Patent
Fluss

(10) Patent No.: US 12,084,007 B1
(45) Date of Patent: Sep. 10, 2024

(54) FLAT TIRE TROLLEY

(71) Applicant: Martin Fluss, Lake Worth, FL (US)

(72) Inventor: Martin Fluss, Lake Worth, FL (US)

( * ) Notice: Subject to any disclaimer, the term of this patent is extended or adjusted under 35 U.S.C. 154(b) by 0 days.

(21) Appl. No.: 18/663,827

(22) Filed: May 14, 2024

Related U.S. Application Data

(63) Continuation-in-part of application No. 17/803,637, filed on Sep. 13, 2022.

(51) Int. Cl.
| | |
|---|---|
| B60S 13/00 | (2006.01) |
| B62B 3/10 | (2006.01) |
| B62B 5/00 | (2006.01) |
| B62B 5/04 | (2006.01) |

(52) U.S. Cl.
CPC ............. B60S 13/00 (2013.01); B62B 3/10 (2013.01); B62B 5/0083 (2013.01); B62B 5/0433 (2013.01); B62B 2202/90 (2013.01)

(58) Field of Classification Search
CPC ......... B60S 13/00; B62B 3/10; B62B 5/0083; B62B 5/0433; B62B 2202/90; B60B 33/0042; B60B 2900/711; B60B 33/006; B60B 33/0078; B60B 33/0081; B60B 33/0086; B66F 7/246
See application file for complete search history.

(56) References Cited

U.S. PATENT DOCUMENTS

| | | | | |
|---|---|---|---|---|
| 1,970,159 A | * | 8/1934 | Zehnbauer | B66F 7/246 |
| | | | | 280/43.24 |
| 2,358,864 A | * | 9/1944 | Lockwood | B66F 7/246 |
| | | | | 280/47.12 |
| 2,552,804 A | * | 5/1951 | Morris | B66F 7/246 |
| | | | | 280/137.5 |
| 2,607,607 A | * | 8/1952 | Day | B66F 7/246 |
| | | | | 16/22 |
| 2,608,312 A | * | 8/1952 | Day | B66F 7/246 |
| | | | | 414/430 |
| 3,145,860 A | * | 8/1964 | Graves | B62H 1/12 |
| | | | | 193/41 |

(Continued)

FOREIGN PATENT DOCUMENTS

| | | | | |
|---|---|---|---|---|
| CN | 204915636 U | * | 12/2015 | |
| CN | 106004810 A | * | 10/2016 | B60B 33/045 |

(Continued)

*Primary Examiner* — James A Shriver, II
*Assistant Examiner* — Ian Bryce Shelton
(74) *Attorney, Agent, or Firm* — Nolan IP Law; Jason Nolan

(57) ABSTRACT

A trolley for a vehicle wheel with a flat tire and a kit having the same are disclosed. The trolley can include a cradle with a bottom wall, a pair of side walls, a front wheel abutment, a front deck projecting from the abutment, and an open rear end having a pivotable ramp; a pair of rear wheels; and a front wheel assembly coupled to the front deck having a pair of arms, a pair of front wheels, and a brake assembly. The brake assembly can have a pair of brake pads configured to contact the front wheels when in an engaging position. The trolley can include a pair of posts projecting downward from the front deck, and the front wheel assembly can include a tine projecting rearward that contacts the posts when rotated. The kit can include the trolley and straps for coupling the trolley to the vehicle wheel.

20 Claims, 19 Drawing Sheets

(56) References Cited

U.S. PATENT DOCUMENTS

| | | | | |
|---|---|---|---|---|
| 3,224,611 A * | 12/1965 | Smuck | .................... | B66F 7/246 414/430 |
| 4,350,470 A * | 9/1982 | Murillo | ................ | B60B 29/002 414/430 |
| 4,447,932 A * | 5/1984 | Mueller | .............. | B60B 33/0042 16/21 |
| 4,465,421 A * | 8/1984 | Murillo | ................... | B66F 7/246 414/430 |
| 4,726,727 A * | 2/1988 | Tyler | ....................... | B66F 7/246 188/4 R |
| 5,039,123 A * | 8/1991 | Smeitink | ................ | B66F 7/246 280/37 |
| 5,042,622 A * | 8/1991 | Smith | ....................... | B62B 5/04 188/29 |
| 5,248,235 A * | 9/1993 | Poten | ....................... | B66F 7/246 280/43.11 |
| 5,497,856 A * | 3/1996 | Block | ................ | B60B 33/0081 188/68 |
| 8,910,957 B1 * | 12/2014 | Hassell | ................... | B60P 3/122 254/108 |
| 10,266,006 B2 * | 4/2019 | Weis | ................... | B60B 33/0042 |
| 11,260,992 B1 * | 3/2022 | Wiskus | ................... | B64F 1/227 |
| 11,648,800 B2 * | 5/2023 | Winters | .................... | B64F 5/50 414/426 |
| 2003/0021661 A1 * | 1/2003 | Fluss | ....................... | B62B 5/049 414/430 |
| 2005/0017470 A1 * | 1/2005 | Abbott | ................... | B60P 3/127 280/79.4 |
| 2008/0272137 A1 * | 11/2008 | Fitzgerald | ................ | A47F 3/06 312/294 |
| 2009/0191035 A1 * | 7/2009 | LaBruyere | ........... | B62B 5/0083 414/427 |
| 2011/0061979 A1 * | 3/2011 | Tai | ........................ | B62B 5/0485 188/22 |
| 2012/0180259 A1 * | 7/2012 | Frame | ................ | B60B 33/0021 16/45 |
| 2014/0037409 A1 * | 2/2014 | Winters | ................... | B60B 30/02 414/427 |
| 2015/0259077 A1 * | 9/2015 | Wiskus | ..................... | B64F 1/22 414/800 |
| 2016/0089932 A1 * | 3/2016 | Weis | .................... | B60B 33/0078 188/1.12 |
| 2018/0319213 A1 * | 11/2018 | Doerflinger | ........... | B60B 33/025 |
| 2021/0031735 A1 * | 2/2021 | Hong | ..................... | B60B 30/10 |
| 2021/0094349 A1 * | 4/2021 | Aubin | ................. | B60B 33/0068 |
| 2021/0394556 A1 * | 12/2021 | Winters | ................... | B60B 30/04 |

FOREIGN PATENT DOCUMENTS

| | | | | |
|---|---|---|---|---|
| CN | 107336564 A | * | 11/2017 | ......... B60B 33/0039 |
| CN | 108189816 A | * | 6/2018 | ............. B60S 13/00 |
| CN | 207931693 U | * | 10/2018 | |
| CN | 113352815 A | * | 9/2021 | |
| DE | 202009005275 U1 | * | 1/2010 | ......... B60B 33/0028 |
| DE | 202015103927 U1 | * | 10/2015 | ......... B60B 33/0042 |
| GB | 2255536 A | * | 11/1992 | ............. B60S 13/00 |
| JP | S60180678 U | * | 11/1985 | |
| KR | 100857174 B1 | * | 9/2008 | |
| NL | 9300379 A | * | 10/1994 | ........... B60B 29/002 |
| WO | WO-0061486 A1 | * | 10/2000 | ............... B62B 5/02 |

* cited by examiner

FLAT TIRE TROLLEY

CROSS-REFERENCE TO RELATED APPLICATIONS

This is a continuation-in-part of U.S. patent application Ser. No. 17/803,637 filed on Sep. 13, 2022, the content of which is relied upon and incorporated herein by reference in its entirety, and the benefit of priority under 35 U.S.C. § 120 is hereby claimed.

FIELD

The disclosure relates to flat tire trollies, and more particularly to a trolley on which a flat tire of a vehicle wheel can be positioned and secured to and which therefore allows the vehicle to be drivable.

BACKGROUND

Existing flat tire trolleys are disclosed in U.S. Pat. Nos. 2,608,312; 2,350,118; 3,224,611; 4,465,421; 4,913,459; and 4,726,727. The trolleys in those patents do not include safety loading and arresting mechanisms. The wheel arresting mechanisms for most of those trolleys are not secure and may disconnect during use. Some of the trolleys are not compact in structure and would be a nuisance to motorists when stored in the trunk of a vehicle. And some of the trolleys may be projectiles when a vehicle wheel is loaded or unloaded from the trolley because they lack a braking stopper on the wheel(s).

SUMMARY

In various embodiments, a flat tire trolley for a vehicle wheel having a flat tire, the flat tire trolley comprising: a cradle comprising a bottom support wall, a pair of side walls projecting upward from opposite longitudinal sides of the bottom support wall, a front wheel abutment projecting upward from a front lateral side of the bottom support wall, the front wheel abutment being joined on opposite ends to the pair of side walls, a front deck projecting outward from the front wheel abutment, and an open rear end having a pivotable ramp secured to the pair of side walls; a pair of rear wheels coupled to the cradle; and a front wheel assembly comprising a plate that is rotatably coupled to an underside of the front deck, a pair of arms projecting downward from lateral ends of the plate, a pair of front wheels coupled via a front axle to the pair of arms, and a brake assembly coupled to the plate, the brake assembly comprising a pair of brake pads that are configured and positioned to forcibly contact respective wheels of the pair of front wheels when in an engaging position and to not contact the respective wheels when in a non-engaging position.

In some embodiments, the brake assembly further comprises a lever that is coupled to the pair of brake pads, the lever being configured to move the brake pads from the engaging position to the non-engaging position during use.

In some embodiments, the pair of brake pads and the lever are coupled to a bar that moves the brake pads between the engaging position and the non-engaging position using a spring that is coupled to the lever and the bar.

In some embodiments, the front wheel abutment is configured to arrest a forward movement of the vehicle wheel during use.

In some embodiments, the pivotable ramp is secured to the pair of side walls by a ramp axle extending between the pair of side walls.

In some embodiments, the pair of rear wheels are coupled to an underside of the bottom support wall. In some embodiments, the respective wheels of the pair of rear wheels are positioned in proximity to the open rear end.

In some embodiments, each respective wheel of the pair of rear wheels and the pair of front wheels are comprised of a metal alloy that resists deformation in a compression test for loads over 20,000 pounds. In some embodiments, each respective wheel of the pair of rear wheels and the pair of front wheels are comprised of a metal alloy that resists deformation in a compression test for loads over 50,000 pounds.

In some embodiments, the flat tire trolley includes a brake assembly for each of the rear wheels. In some embodiments, the flat tire trolley does not include a brake assembly on either of the rear wheels and the only brake assembly is the front wheels brake assembly.

In various embodiments, a flat tire trolley for a vehicle wheel having a flat tire, the flat tire trolley comprising: a cradle comprising a bottom support wall, a pair of side walls projecting upward from opposite longitudinal sides of the bottom support wall, a front wheel abutment projecting upward from a front lateral side of the bottom support wall, the front wheel abutment being joined on opposite ends to the pair of side walls, an open rear end having a pivotable ramp secured to the pair of side walls, and a front deck projecting outward from the front wheel abutment, the front deck comprising pair of posts projecting downward from an underside of the front deck, the respective posts being spaced apart from one another; a pair of rear wheels coupled to the cradle; and a front wheel assembly comprising a plate that is rotatably coupled via a fastener to the underside of the front deck, a pair of arms projecting downward from lateral ends of the plate, a pair of front wheels coupled via a front axle to the pair of arms, and a tine projecting rearward from the plate toward the front wheel abutment; wherein the tine projects rearward to a position between the pair of posts such that the front wheel assembly can only be rotated about the fastener between a first position in which the tine contacts a first respective post of the pair of posts and a second position in which the tine contacts a second respective post of the pair of posts.

In some embodiments, the pair of posts are spaced apart at a distance sufficient to restrict the front wheel assembly from rotating more than 60 degrees. In some embodiments, the pair of posts are spaced apart at a distance sufficient to restrict the front wheel assembly from rotating more than 45 degrees.

In some embodiments, the front wheel assembly further comprises a brake assembly coupled to the plate, the brake assembly comprising a pair of brake pads that are configured and positioned to forcibly contact respective wheels of the pair of front wheels when in an engaging position and to not contact the respective wheels when in a non-engaging position.

In some embodiments, the brake assembly further comprises a lever that is coupled to the pair of brake pads, the lever being configured to move the brake pads from the engaging position to the non-engaging position during use.

In some embodiments, the pair of brake pads and the lever are coupled to a bar that moves the brake pads between the engaging position and the non-engaging position using a spring that is coupled to the lever and the bar.

In various embodiments, a kit for a vehicle wheel having a flat tire, comprising: a flat tire trolley comprising: a cradle comprising a bottom support wall, a pair of side walls projecting upward from opposite longitudinal sides of the bottom support wall, a front wheel abutment projecting upward from a front lateral side of the bottom support wall, the front wheel abutment being joined on opposite ends to the pair of side walls, a front deck projecting outward from the front wheel abutment, and an open rear end having a pivotable ramp secured to the pair of side walls; a pair of rear wheels coupled to the cradle; and a front wheel assembly comprising a plate that is rotatably coupled via a fastener to an underside of the front deck, a pair of arms projecting downward from lateral ends of the plate, a pair of front wheels coupled via a front axle to the pair of arms, and a brake assembly coupled to the plate, the brake assembly comprising a pair of brake pads that are configured and positioned to forcibly contact respective wheels of the pair of front wheels when in an engaging position and to not contact the respective wheels when in a non-engaging position; and a plurality of straps for fastening the flat tire trolley to the vehicle wheel having the flat tire.

In some embodiments, the front deck further comprises pair of posts projecting downward from the underside of the front deck, the respective posts being spaced apart from one another; wherein the front wheel assembly further comprises a tine projecting rearward from the plate toward the front wheel abutment; and wherein the tine projects rearward to a position between the pair of posts such that the front wheel assembly can only be rotated about the fastener between a first position in which the tine contacts a first respective post of the pair of posts and a second position in which the tine contacts a second respective post of the pair of posts.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, explain the principles and operations of the claimed subject matter.

BRIEF DESCRIPTION OF THE DRAWINGS

A complete understanding of the present embodiments and the advantages and features thereof will be more readily understood by reference to the following detailed description, appended claims, and accompanying drawings, wherein:

Figure 1:
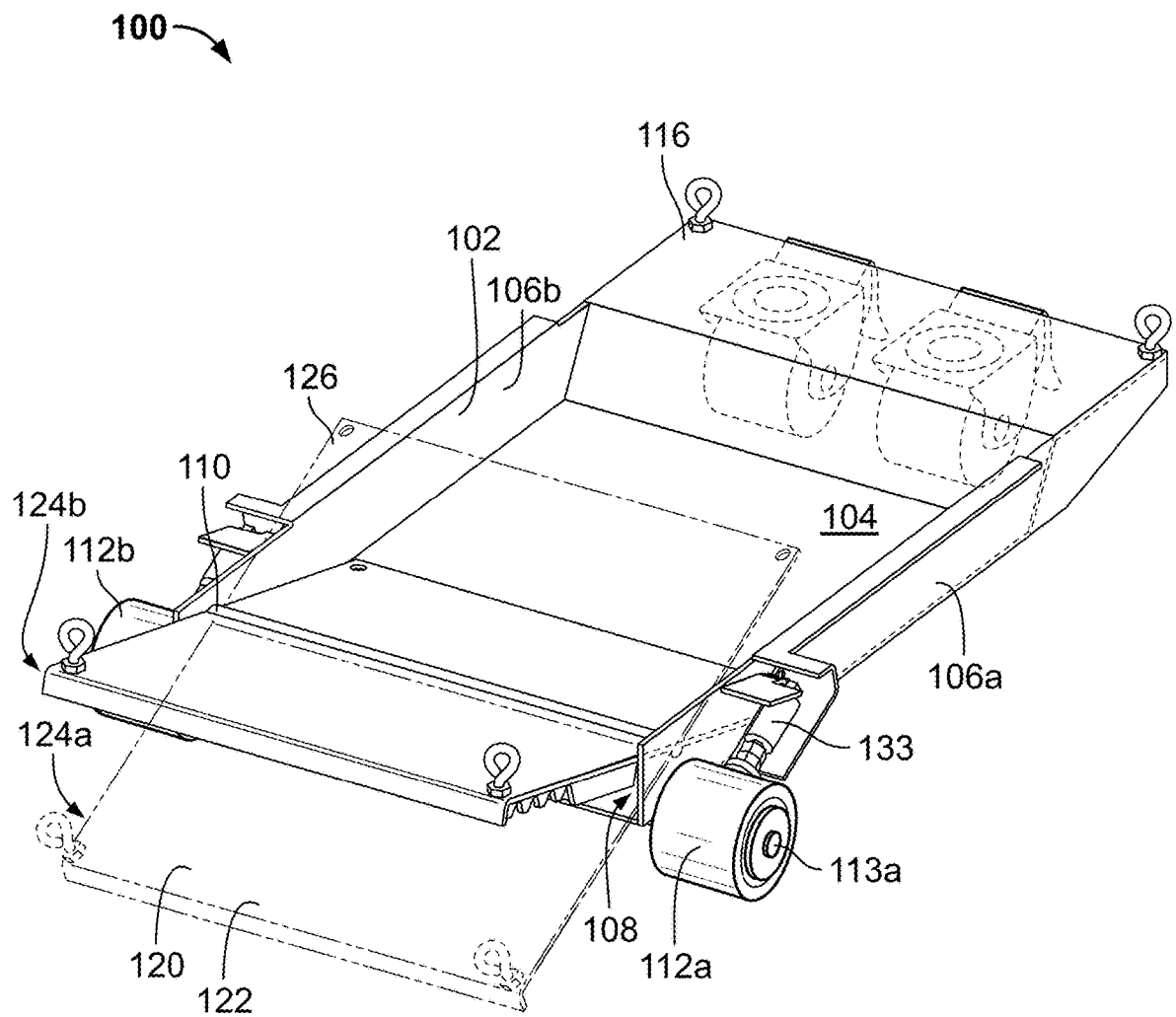
FIG. 1 is a top rear perspective view of an automobile flat tire trolley, in accordance with some embodiments described herein.
Figure 2:
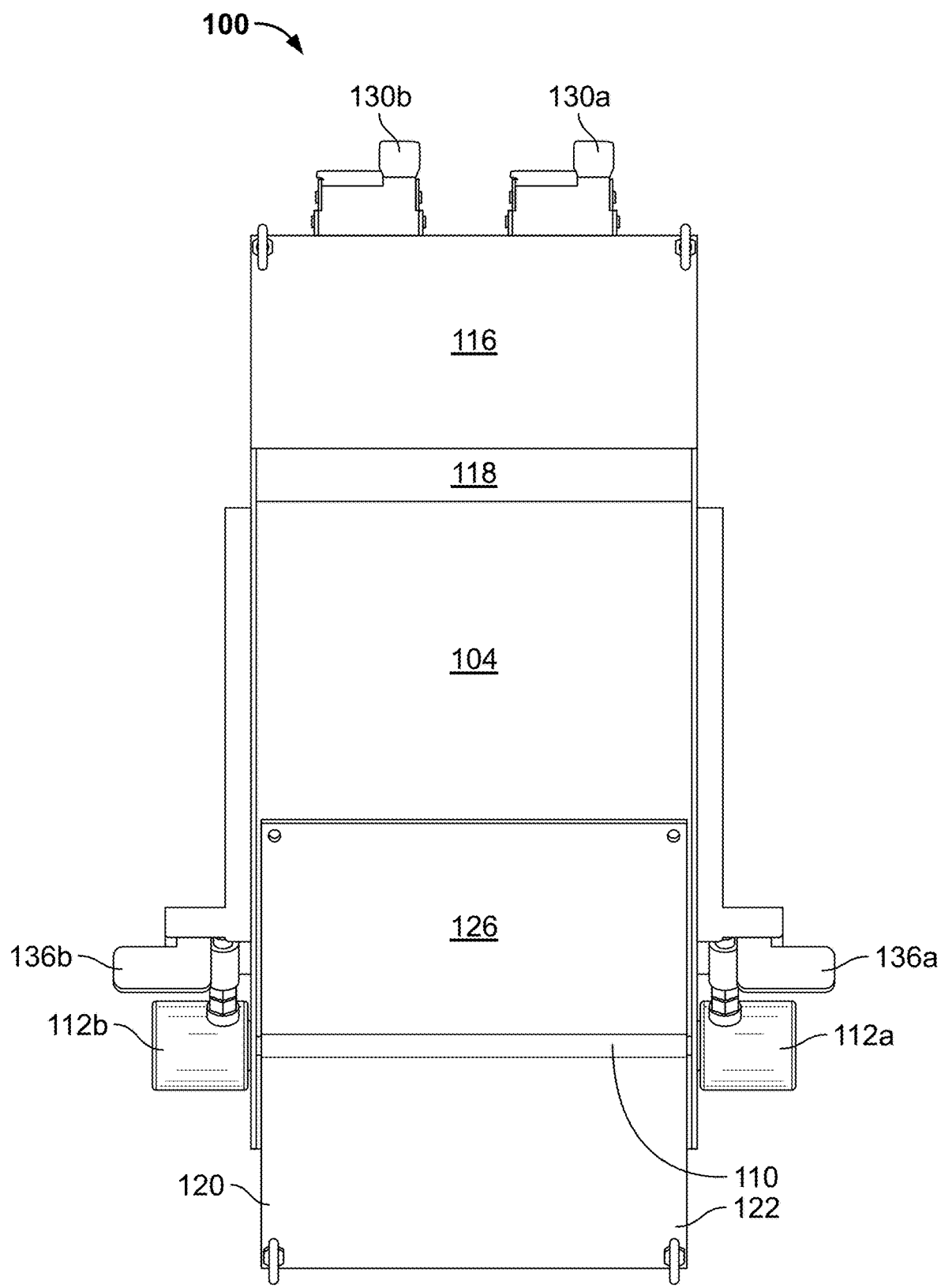
FIG. 2 is a top view of the automobile flat tire trolley of FIG. 1.

The drawings are not necessarily to scale, and certain features and certain views of the drawings may be shown exaggerated in scale or in schematic in the interest of clarity and conciseness.

DETAILED DESCRIPTION

Reference will now be made in detail to the exemplary embodiment(s), examples of which is/are illustrated in the accompanying drawings. Whenever possible, the same reference characters will be used throughout the drawings to refer to the same or like parts. Although specific features of the present embodiments may be shown in some drawings and not in others, this is for convenience only. Any feature of a drawing may be referenced and/or claimed in combination with any feature of any other drawing. The specific details of the various embodiments described herein are used for demonstration purposes only, and no unnecessary limitation or inferences are to be understood therefrom. An embodiment refers to a particular feature or characteristic used in connection with a product described herein. References to an "embodiment" appear throughout the disclosure, and such references are not necessarily referring to the same embodiment or to separate, mutually exclusive embodiment.

Before describing the exemplary embodiments, it is noted the embodiments reside primarily in combinations of components related to an automobile flat tire trolley. Thus, the flat tire trolley components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In various embodiments, the flat tire trolley disclosed herein overcomes the disadvantages of existing devices and provides a solution for flat tires or damaged automobile wheels. Testing was conducted to analyze the flat speed, weight capacity of its steel wheels, steel construction, its many parts, its stopper lever brakes, and for speed capacity. The tests, which took many years, proved to be flawless with embodiments for damaged or flat tires. In addition, it is storable in the trunk of any vehicle.

In various embodiments, as shown in FIGS. 1-7, a flat tire trolley 100 is provided. In some embodiments, the flat tire trolley 100 comprises a cradle 102 having a bottom wheel support wall 104, side walls 106a, 106b, and an open rear end 108. Independent rear axles 113a, 113b are secured to the bottom wheel support wall 104 in a position adjacent to the respective side walls 106a, 106b and adjacent to the open rear end 108. Two rear wheels 112a, 112b are secured to the respective rear axles 113a, 113b and are positioned outside the area defined by the side walls 106a, 106b. Two front wheels 114a, 114b are secured under a front deck 116 of the cradle 102. The two front wheels 114a, 114b and the two rear wheels 113a, 113b support the cradle 102. A front wheel abutment 118 is secured to the cradle 102 above the bottom support wall 104 in a position rearwardly from the front two wheels 114a, 114b. The front wheel abutment 118 is configured to arrest the forward movement of a vehicle wheel positioned in the cradle 102, as shown in FIG. 3C. A pivotal rear ramp 120 is pivotally secured to a ramp axle 110 positioned between the side walls 106a, 106b. The rear ramp 120 has a first inclined ramp section 122 pivotally displaceable from a loading position 124a (FIG. 3A) to permit a vehicle wheel to enter the cradle 102, and an arresting position 124b (FIG. 3C), to retain a vehicle wheel in the cradle 102. The rear ramp 120 has a second plate section 126 that is secured to the first plate section 122 and projects inwardly in the cradle 102 and upwards of the ramp axle 110. The second plate section 126 causes the first plate section 122 to pivot upwardly when a load from a vehicle is driven thereon whereby the second plate section 126 is retained in the arresting position 124b by the vehicle wheel, as shown in FIGS. 3A-3C.

In various embodiments, the flat tire trolley 100 can be easily stored and carried and can be quickly and safely be attached to a disabled tire with minimal time and energy by the user. In various embodiments, the flat tire trolley 100 is easy to use and does not require any great degree of strength, training, or knowledge to use it effectively. In various embodiments, the flat tire trolley 100 is suitable to replace the spare tires used in most automobiles. In addition, many car dealers no longer offer spare tires, which make the flat tire trolley advantageous for any motorist. In some embodiments, the flat tire trolley 100 comprises the four lever brake stoppers 130a, 130b, 136a, 136b, which create an environment of safety. In some embodiments, as shown in FIG. 3D, straps 500a, 500b are provided. The straps 500a, 500b are configured to secure the tire to the flat tire trolley 100 for additional security while driving. The combination of the flat tire trolley 100 and the straps provide safety and security for any motorist.

In some embodiments, the flat tire trolley 100 comprises a cradle 102. The cradle 102 can be comprised of steel and can include a bottom wheel support wall 104, side walls 106a, 106b, and an open rear end 108. In some embodiments, the flat tire trolley 100 comprises a pair of independent rear axles 113a, 113b secured to the bottom wheel support wall 104 in a position adjacent to the side walls and the open rear end 108. In some embodiments, the top surface of the wheels are elevated relative to the bottom support wall 104. In some embodiments, the two rear wheels 112a, 112b are independently secured to the rear axles 113a, 133b outside the side walls 106a, 106b. In some embodiments, two front wheels 114a, 114b are secured under a front deck 116 of the cradle 102, the front and rear wheels supporting the cradle and elevating it from a ground surface. In some embodiments, the flat tire trolley 100 comprises a front wheels abutment 118 secured to the cradle 102 above the bottom support wall 104 and positioned rearwardly from the front wheels 114a, 114b. The front wheels abutment 118 is configured for arresting the forward movement of a vehicle wheel positioned in the cradle 102. In some embodiments, a pivotal rear ramp 120 is pivotally secured to a ramp axle 110 between the side walls 106a, 106b. The rear ramp 120 can have a first inclined ramp section 122 pivotally displaceable from a loading position 124a to permit a vehicle wheel to enter the cradle 102, and an arresting position 124b to retain a vehicle wheel in the cradle 102. The rear ramp 120 can have a second plate section 126 secured to the first plate section 122 and projecting inwardly in the cradle 102 and upwards of the ramp axle 110. The second plate section 126 can cause the first plate section 122 to pivot upwardly when a vehicle wheel is driven thereon whereby the first plate section 122 is retained in the arresting position 124b by the vehicle wheel. The rear ramp 120 can be constructed such that when in the loading position 124a it causes the rear wheels 112a, 112b to be wedged for ground support surface. In some embodiments, the flat tire trolley 100 comprises a rear braking assembly 133 to prevent displacement of the flat tire trolley 100 when a vehicle wheel is driven in or out of the cradle 102 over the pivotal ramp 120.

In some embodiments, the bottom support wall 104 has a recessed rear portion that defines the rear edge extending spaced forwardly of the ramp axle 110.

In some embodiments, the flat tire trolley 100 comprises a rear braking assembly 133 that is comprised of an arresting element 135 immovably secured to the side walls 106a, 106b and that is configured to engage the rear wheels 112a, 112b in a locking position with the activation of the stopper levers 136a, 136b to prevent the flat tire trolley 100 from being pushed forward when a vehicle wheel is driven up the rear ramp 120 into the cradle 102. In some embodiments, the arresting element 135 comprises a pair of stopper levers 136a, 136b welded to a respective sleeve.

In some embodiments, the rear braking assembly 133 further comprises two rear wheels locking elements 138 to prevent a clockwise rotation of the rear wheels 112a, 112b and a forward projection of the flat tire trolley 100 during unloading of a vehicle wheel from the cradle 102 and over the rear ramp 120 while the rear wheels 112a, 112b are on the support surface. In some embodiments, the rear wheels locking elements 138 prevent the flat tire trolley 100 from being displaced in a rearward direction, the ground support surface being a hard ground surface. In some embodiments, the rear wheels locking elements 138 are engaged by secured rotation. In some embodiments, the bottom support wall 104 has a recessed rear portion which defines the rear edge extending spaced forwardly of the ramp axle 110.

In some embodiments, the first inclined ramp section 122 is provided with ground engagement elements 125 secured thereunder and forming a straight ground engagement surface, the straight engagement surface when lying on a ground surface being spaced from a central longitudinal axis of the ramp axle 110 a distance greater than the radius of the rear wheels. In some embodiments, the ground engagement element 125 is constituted by two or more spaced vertical steel plates secured under the first inclined ramp section 122, the straight ground engagement surface being formed by a straight serrated lower edge of the vertical steel plates.

In some embodiments, the flat tire trolley 100 comprises the front wheels abutment 118, which is a barrier wall projecting above an open top end of the cradle 102 in a forward end and secured to the front deck 116 of the flat tire trolley 100.

In some embodiments, the flat tire trolley 100 comprises the two front wheels 114*a*, 114*b*, which are each secured via a swiveling yoke 115*a*, 115*b*, respectively, under the front frame deck 116 of the cradle 102. The swiveling yokes 115*a*, 115*b* provide approximately 45 degrees of swiveling motion to the front wheels 114*a*, 114*b*, which allows the flat tire trolley 100 to move in leftward, rightward, or a straight forward direction when driving an automobile with a wheel in the cradle 102 of the flat tire trolley 100.

Figure 5A:
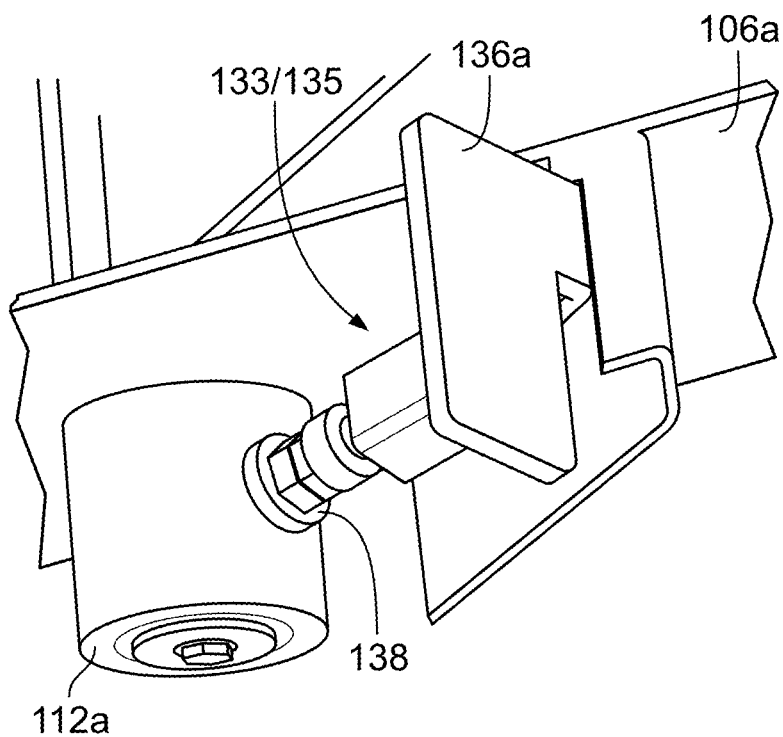
FIG. 5A is a partial perspective view of the automobile flat tire trolley of FIG. 1, with a braking member engaged to a rear wheel of the trolley.
Figure 5B:
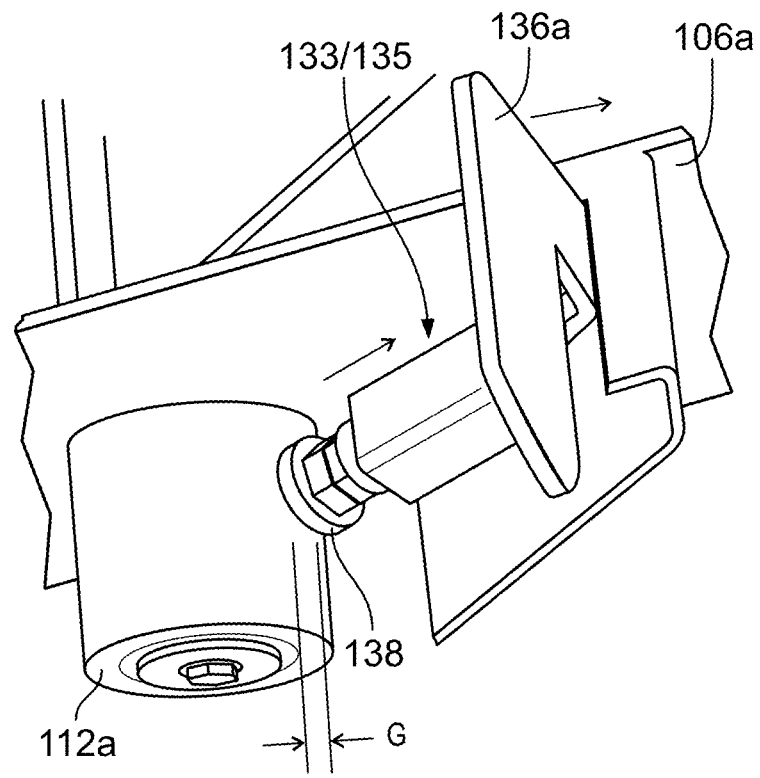
FIG. 5B is a partial perspective view of the automobile flat tire trolley of FIG. 1, with a braking member disengaged to the rear wheel and creating a gap G.

In various embodiments, the flat tire trolley 100 has a reinforced steel cradle 102 with a bottom steel wheel support and an open rear ramp 120. The two rear wheels 112*a*, 112*b*, as shown in FIG. 5A and FIG. 5B, are secured at opposed sides of the rear portion of the flat tire trolley 100 and located outside the side walls 106*a*, 106*b* of the flat tire trolley 100. The two front swivel wheels 114*a*, 114*b* are secured under a front deck 116 to a swiveling yoke 115*a*, 115*b*, respectively. As shown in FIG. 1, and in FIG. 6 and FIG. 7, both front wheels are configured to swivel at a range of 45 degrees of motion, which allows the flat tire trolley 100 to turn a left, right, or forward direction. The front and rear wheels are made from steel and have been tested for weight capacity. Each wheel tested at over 20,000 pounds for weight capacity. With total capacity is 80,000 pounds (4 wheels), the flat tire trolley can be used to transport any vehicle to its destination.

Figure 4:
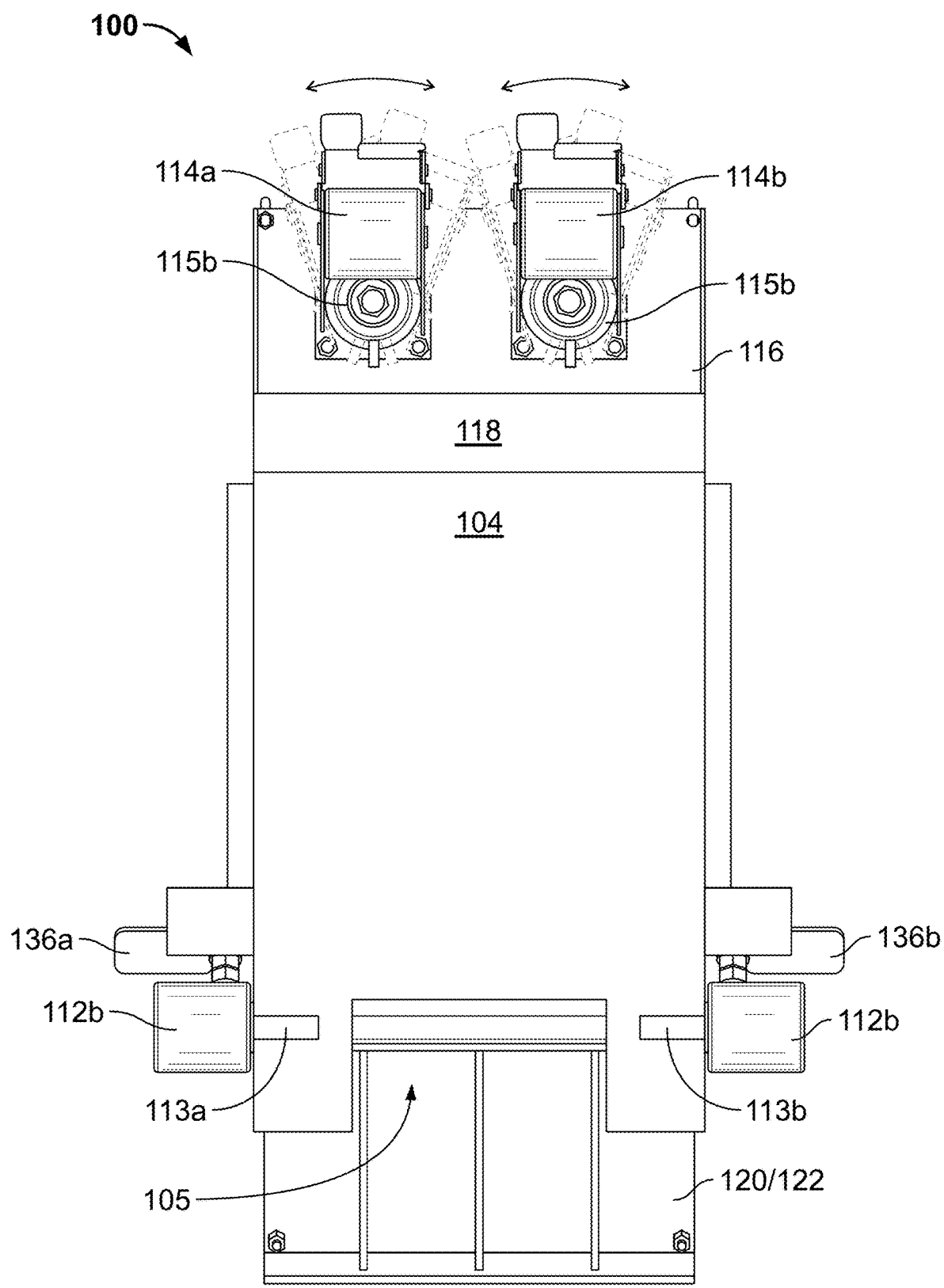
FIG. 4 is a bottom view of the automobile flat tire trolley of FIG. 1.
Figure 6:
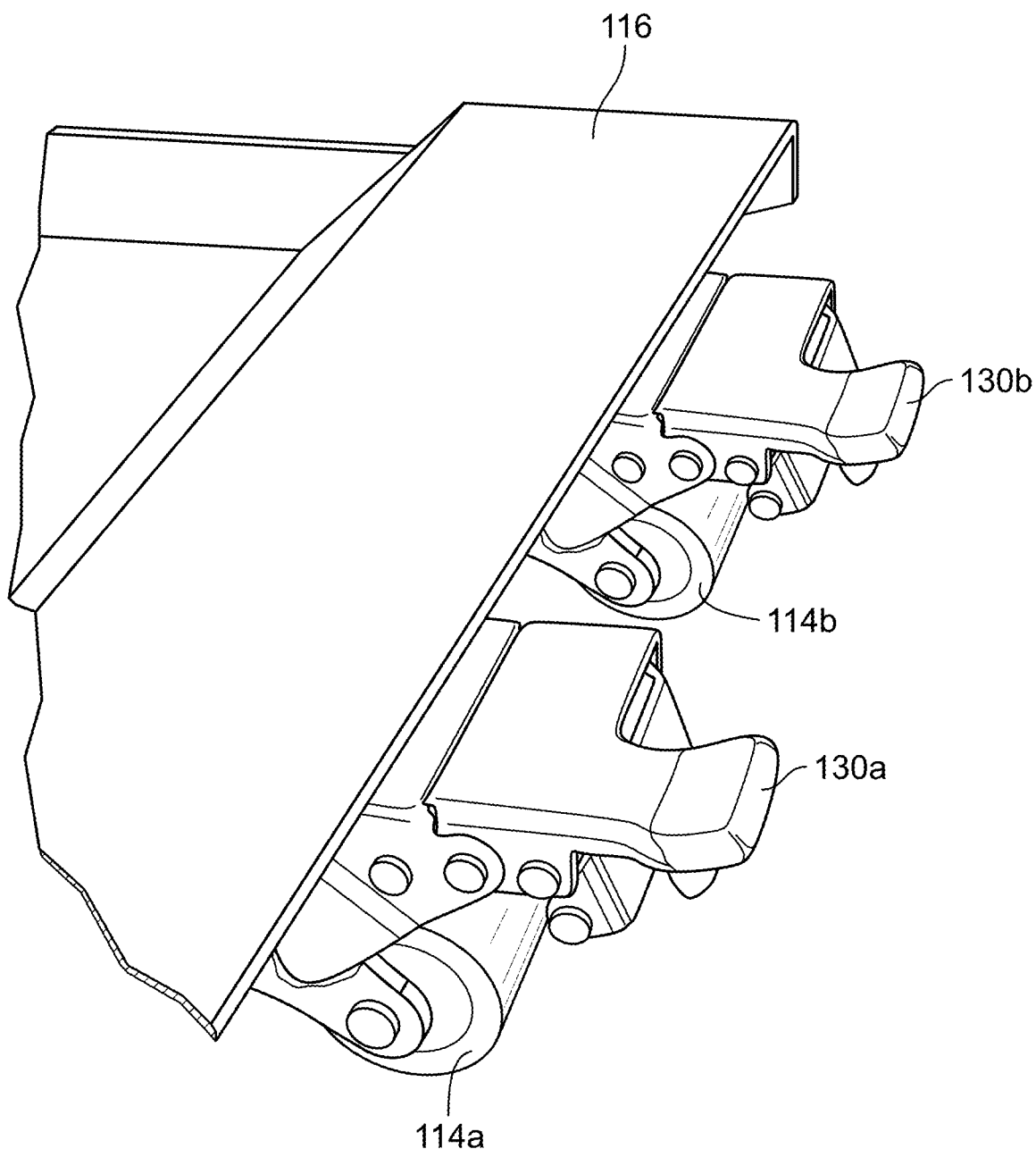
FIG. 6 is a partial top front perspective view of the automobile flat tire trolley of FIG. 1, with the braking members engaged with the front wheels.
Figure 7:
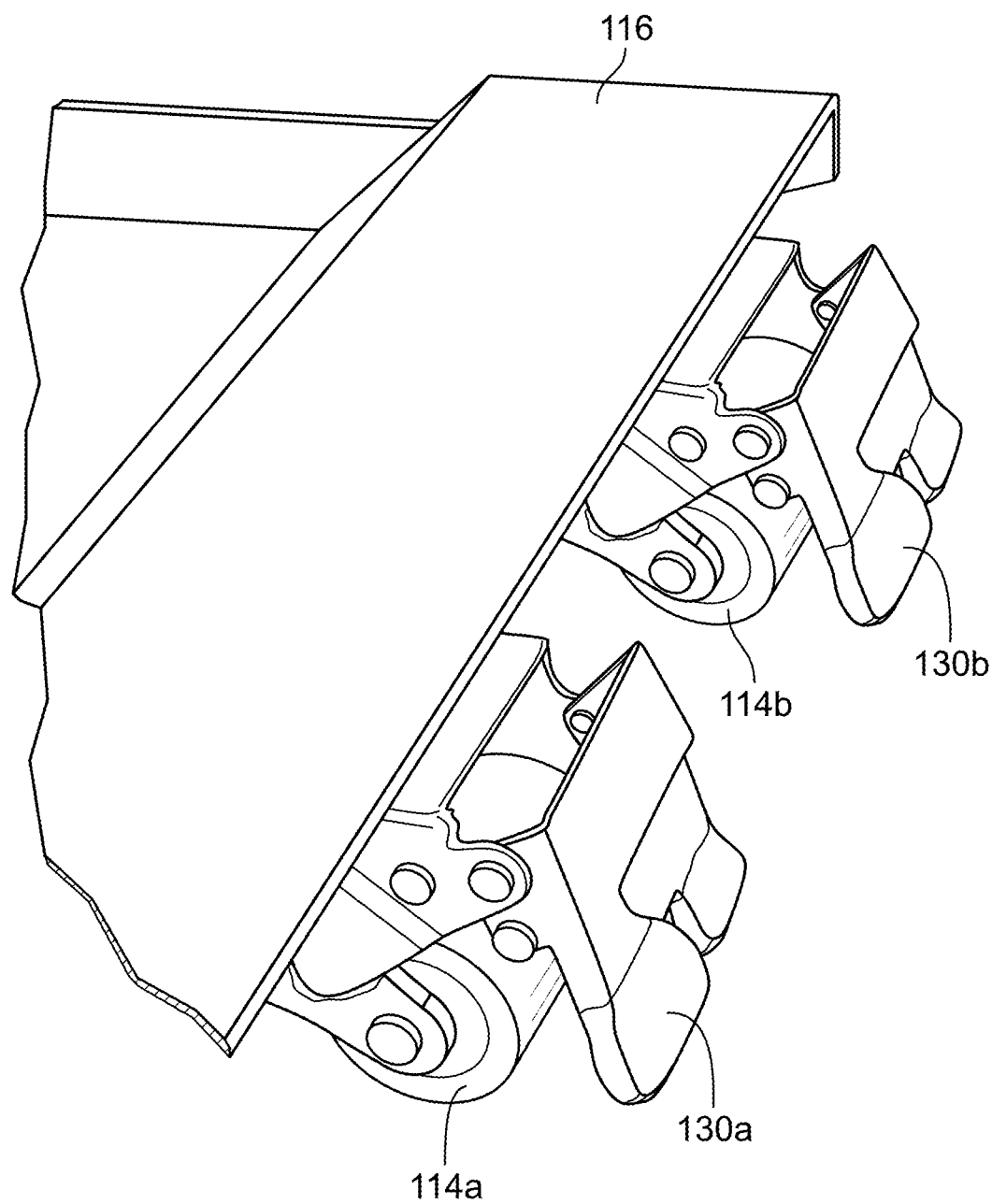
FIG. 7 is a partial top front perspective view of the automobile flat tire trolley of FIG. 1, with the braking members disengaged from the front wheels.

In some embodiments, as shown in FIG. 6, the two front wheels 114*a*, 114*b*, support the cradle 102 when moving forward in order to drive a vehicle with the flat tire FT in the cradle, and both front wheels swivel at a 45 degree angle, as shown by the arrows in FIG. 4. The stopper brake levers 130*a*, 130*b* are not engaged and in a horizontal position, as shown in FIG. 6, to accomplish this driving capability. FIG. 7 is just the opposite function, whereby the two stopper brake levers 130*a*, 130*b* are engaged with the wheels and in a vertical position, which force the flat tire trolley 100 to remain motionless. This stopping function prevents the flat tire trolley 100 from moving forward or reverse when loading or unloading, respectively, the vehicle with the flat tire FT onto the cradle 102.

When the vehicle with the flat tire FT is positioned in the cradle 102, the four steel wheels function for complete safety, and are used in the same function when going forward to drive the vehicle, or for getting the vehicle with the flat tire FT off of the flat tire trolley 100. Referring to FIG. 5A, FIG. 5B, FIG. 6, and FIG. 7, the stopper brake levers 130*a*, 130*b*, 136 were incorporated to avoid injury to any motorist, and to avoid damage to the vehicle. For additional safety, the flat tire trolley 100 is provided in a kit with one or more ratchet straps 500*a*, 500*b*, which secure the tire to both ends of the flat tire trolley 100, as shown in FIG. 3D.

Figure 3A:
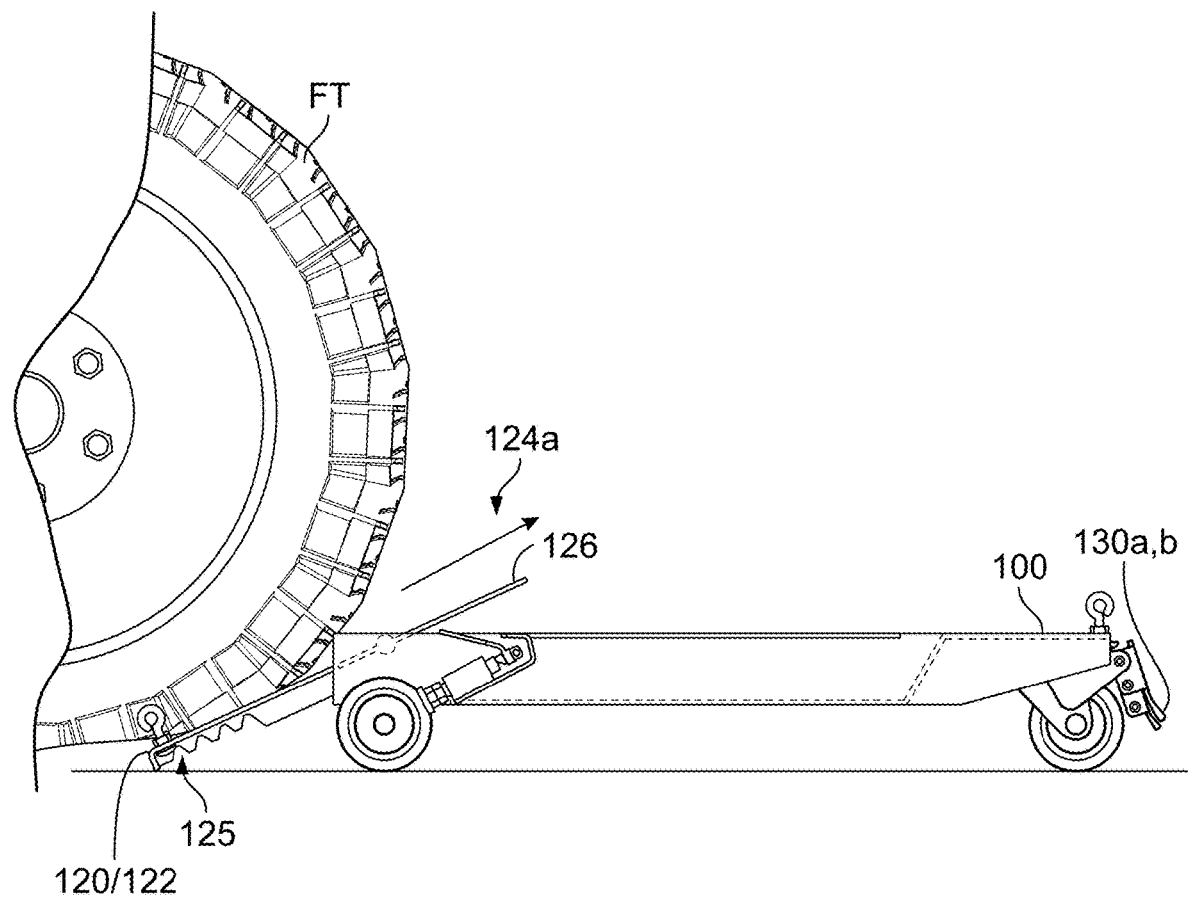
FIG. 3A is a side elevational view of the automobile flat tire trolley of FIG. 1, with an automobile flat tire being loaded onto the flat tire trolley.
Figure 3B:
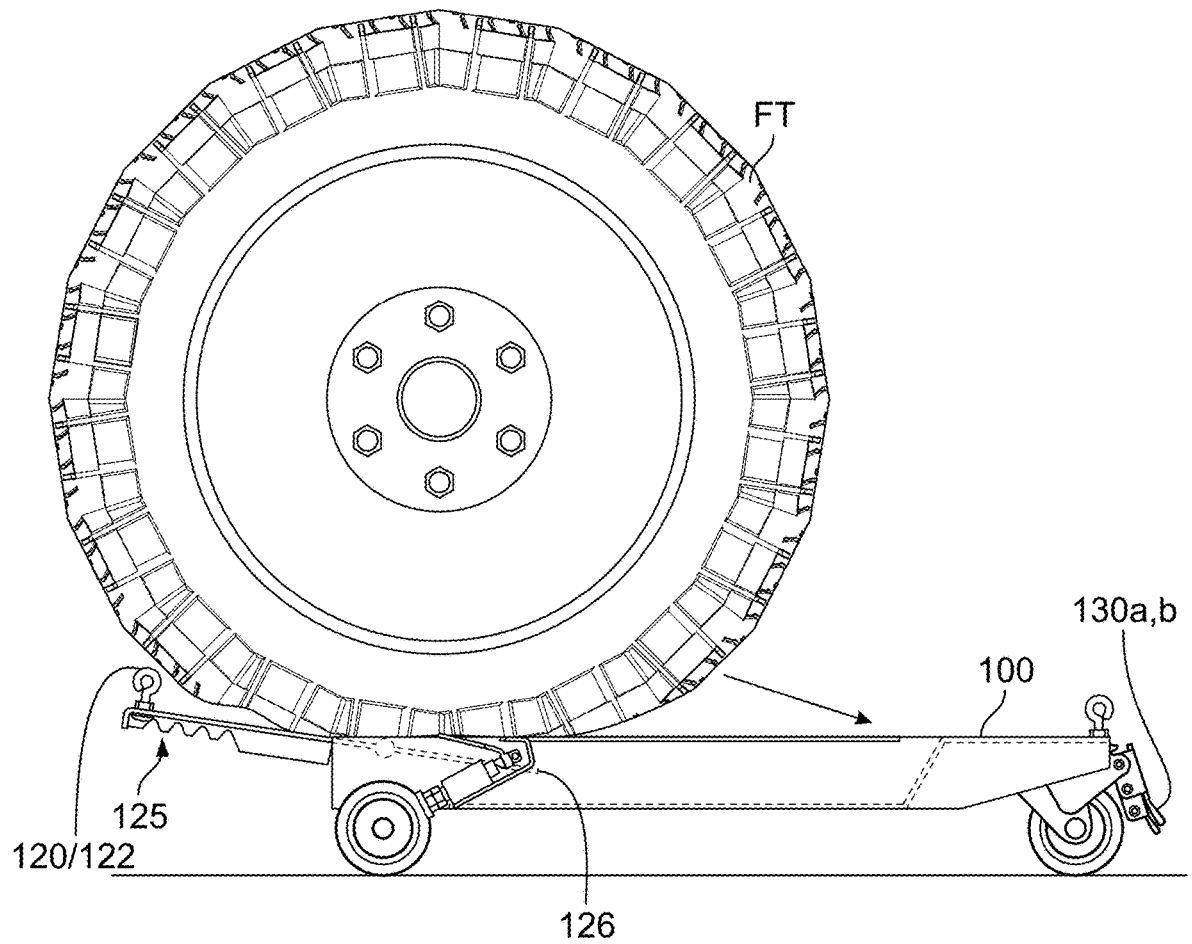
FIG. 3B is a side elevational view of the automobile flat tire trolley of FIG. 1, with an automobile flat tire being further loaded onto the flat tire trolley.
Figure 3C:
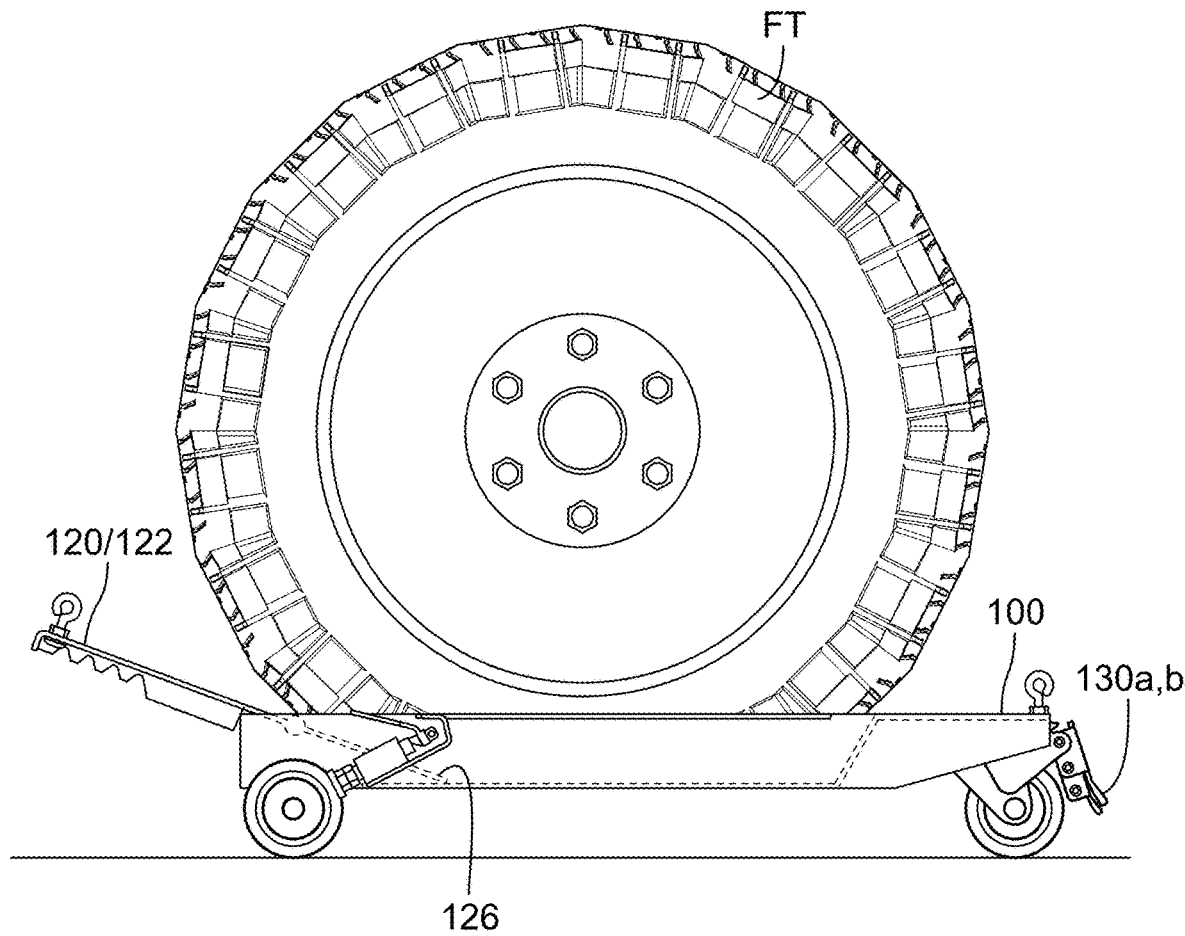
FIG. 3C is a side elevational view of the automobile flat tire trolley of FIG. 1, with an automobile flat tire loaded and in a final resting position on the flat tire trolley.
Figure 3D:
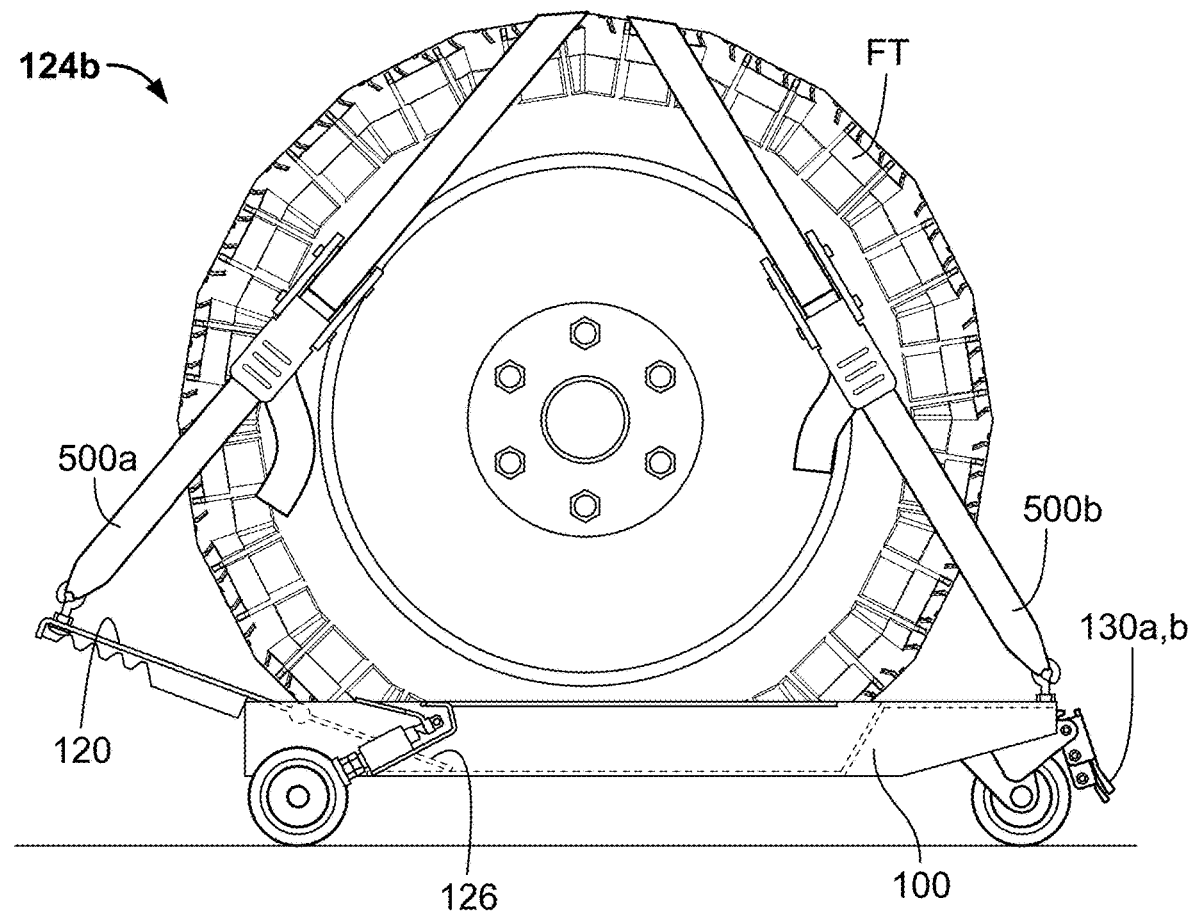
FIG. 3D is a side elevational view of the automobile flat tire trolley of FIG. 1, with an automobile flat tire loaded and in a final resting position on the flat tire trolley and with straps applied to the automobile flat tire and flat tire trolley.

In various embodiments, the flat tire trolley 100 comprises a pivotal rear ramp 120, as shown in FIG. 3A, which is pivotally secured to the ramp axle 110. The rear ramp 120 has a first plate section 122 that can be inclined pivotally displaceable for loading position 124*a*, to an arresting position 124*b* to permit a vehicle wheel to enter and become captive in the cradle, as shown in FIG. 3B and FIG. 3C. The pivotal action of the first plate section 122 is provided by an extension of this ramp by a second plate section 126 that projects inwardly and upwards of the rear axle, as shown in FIG. 3A. The second plate section 126 will hinge inwardly and downward between the cradle side walls 106*a*, 106*b* to rest on the cradle bottom wall 104 as a vehicle wheel enters the cradle 102 over the ramp, as shown in FIG. 3C. The second plate section 126 simultaneously causes the first plate section 122 to move upwardly and with the second plate section 126 moving downwardly. Accordingly, the first plate section is retained in its arresting position by the vehicle load against the second load.

Figure 8:
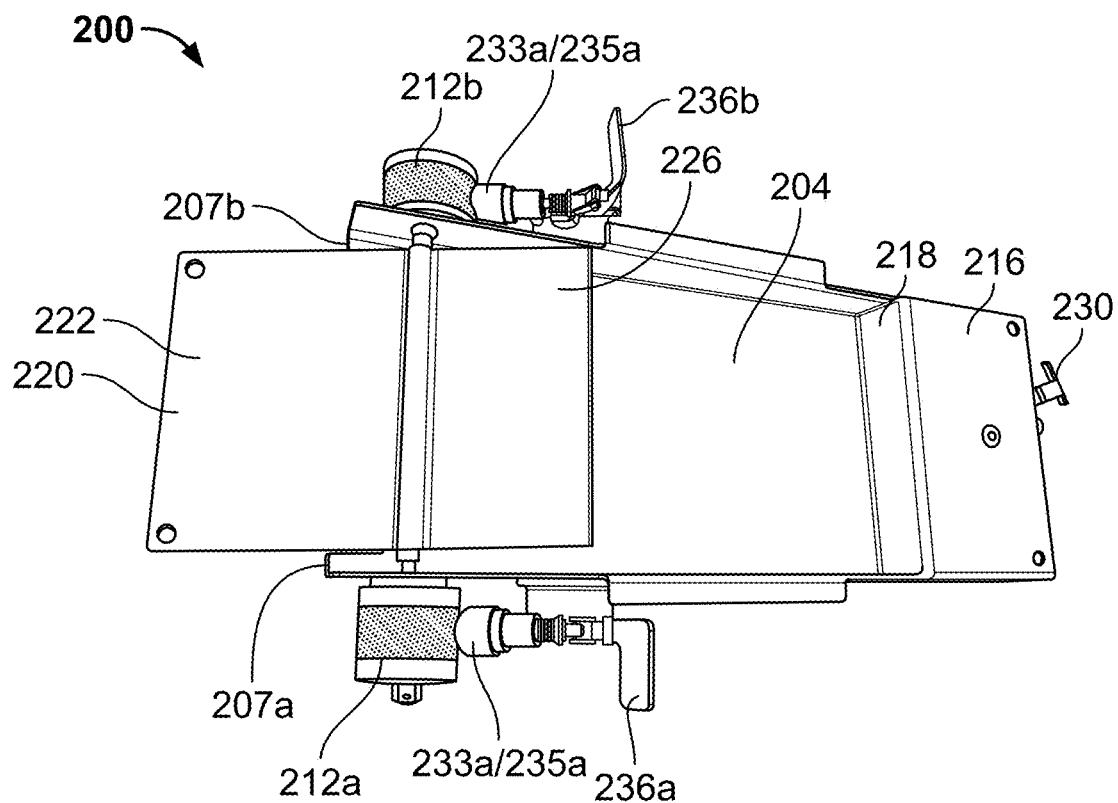
FIG. 8 is a top rear perspective view of an automobile flat tire trolley, in accordance with some embodiments described herein.
Figure 9:
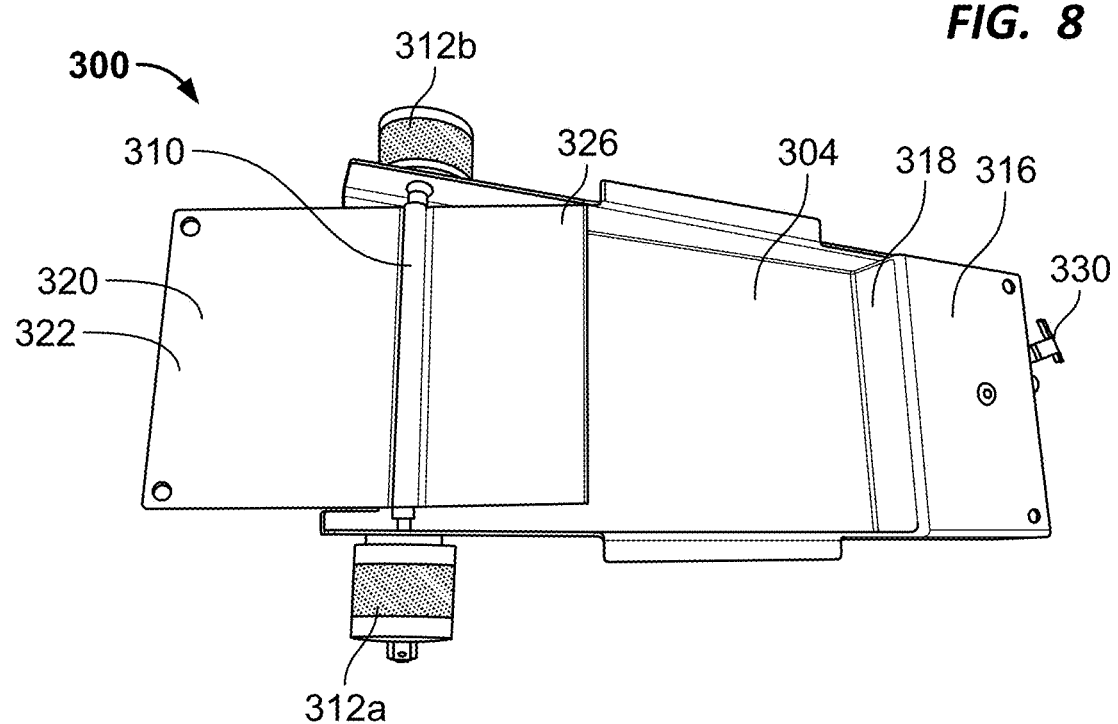
FIG. 9 is a top rear perspective view of an automobile flat tire trolley, in accordance with some embodiments described herein.
Figure 10:
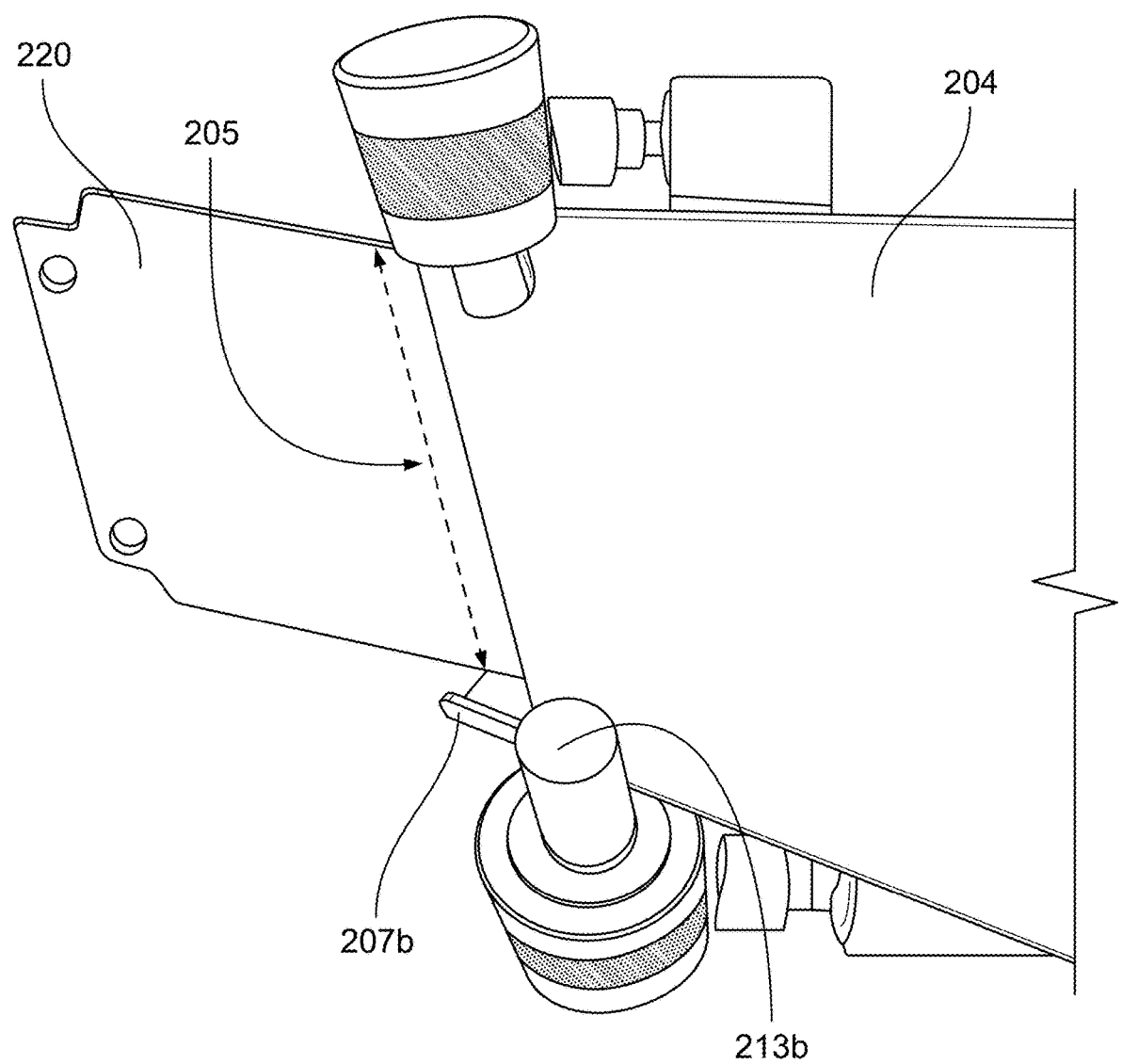
FIG. 10 is a partial bottom perspective view of the automobile flat tire trolley of FIG. 8.
Figure 11:
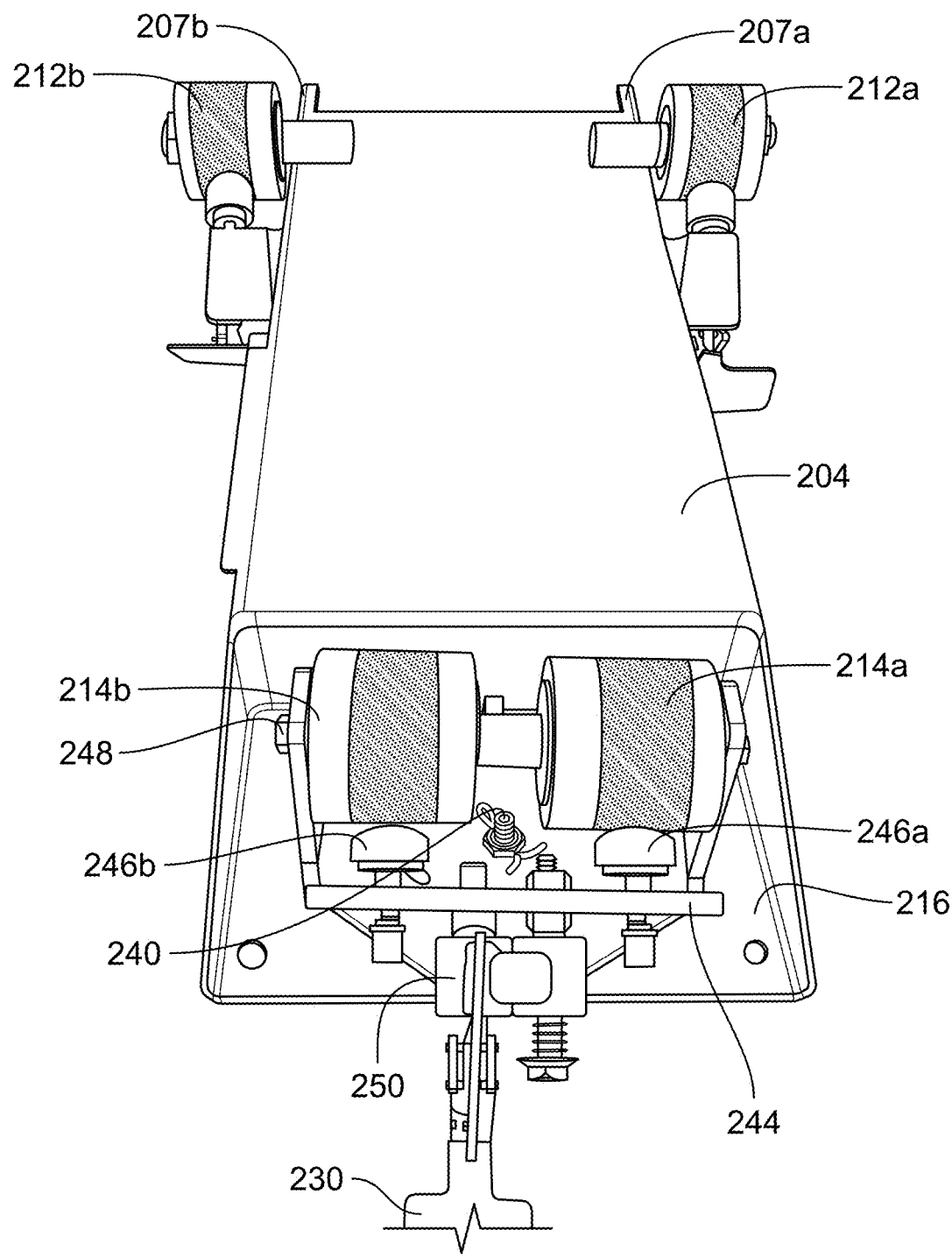
FIG. 11 is a bottom perspective view of the automobile flat tire trolley of FIG. 8.
Figure 16:
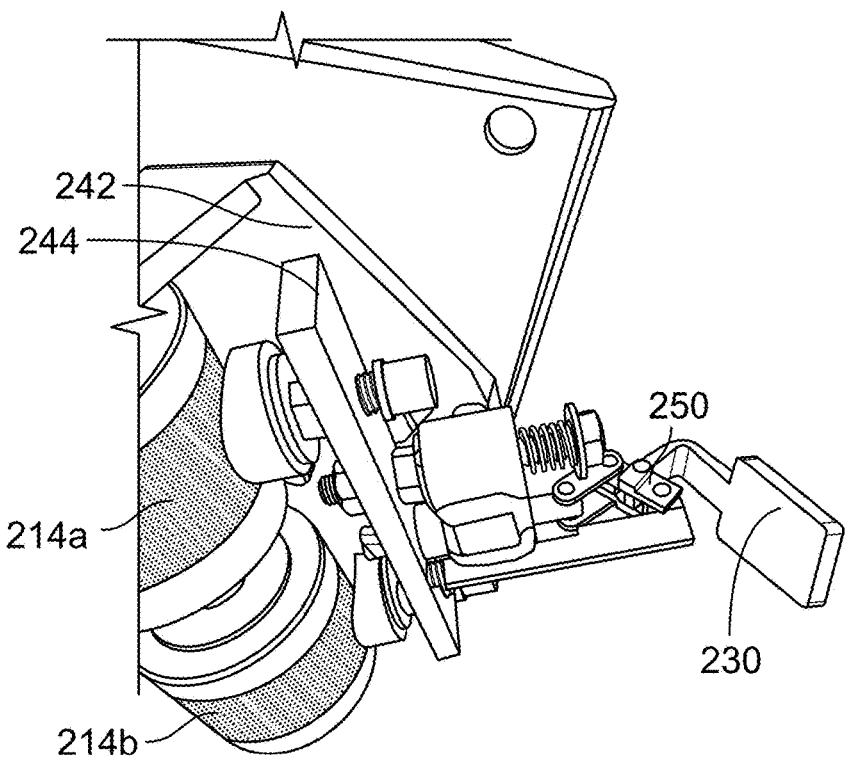
FIG. 16 is a partial side perspective view of the automobile flat tire trolley of FIG. 8 and FIG. 9, showing the brake pads engaged with the front wheels.
Figure 17:
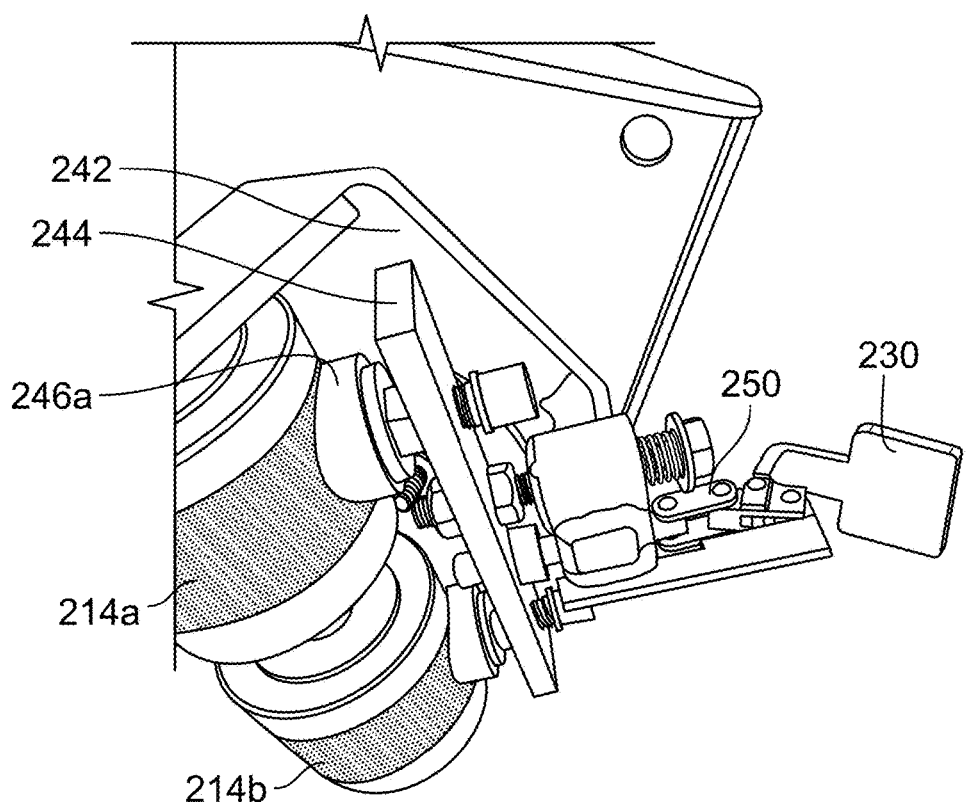
FIG. 17 is a partial side perspective view of the automobile flat tire trolley of FIG. 8 and FIG. 9, showing the brake pads disengaged with the front wheels.
Figure 18:
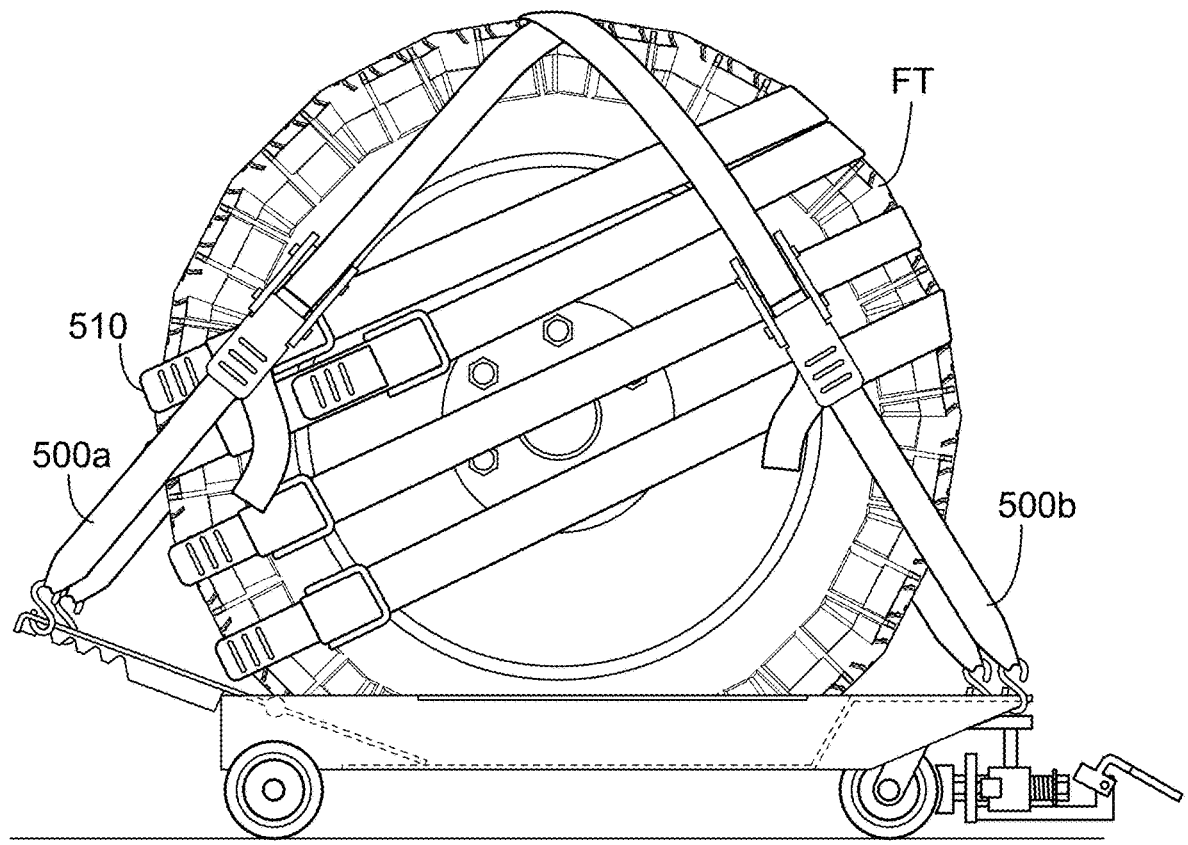
FIG. 18 is a side view of the automobile flat tire trolley of FIG. 9, with an automobile flat tire loaded and in a final resting position on the flat tire trolley and with straps applied to the automobile flat tire and flat tire trolley.

In various embodiments, as shown in FIGS. 8 and 10-17, a flat tire trolley 200 is provided. In various embodiments, as shown in FIGS. 9 and 18, a flat tire trolley 300 is provided. In some embodiments, the flat tire trolley 300 is substantially the same as the embodiments of the flat tire trolley 200 except for the absence of rear wheel brake assemblies. As shown in FIGS. 9 and 18, the flat tire trolley 300 does not have brake assemblies in proximity to and configured to stop the rear wheels 312*a*, 312*b* from rotating. The omission of rear stoppers eliminates a step of engaging the stoppers to the rear wheels 312*a*, 312*b* during use. The omission of rear brake assemblies is also advantageous because it reduces the weight of flat tire trolley 300 relative to the flat tire trolley 100 and flat tire trolley 200.

Figure 12:
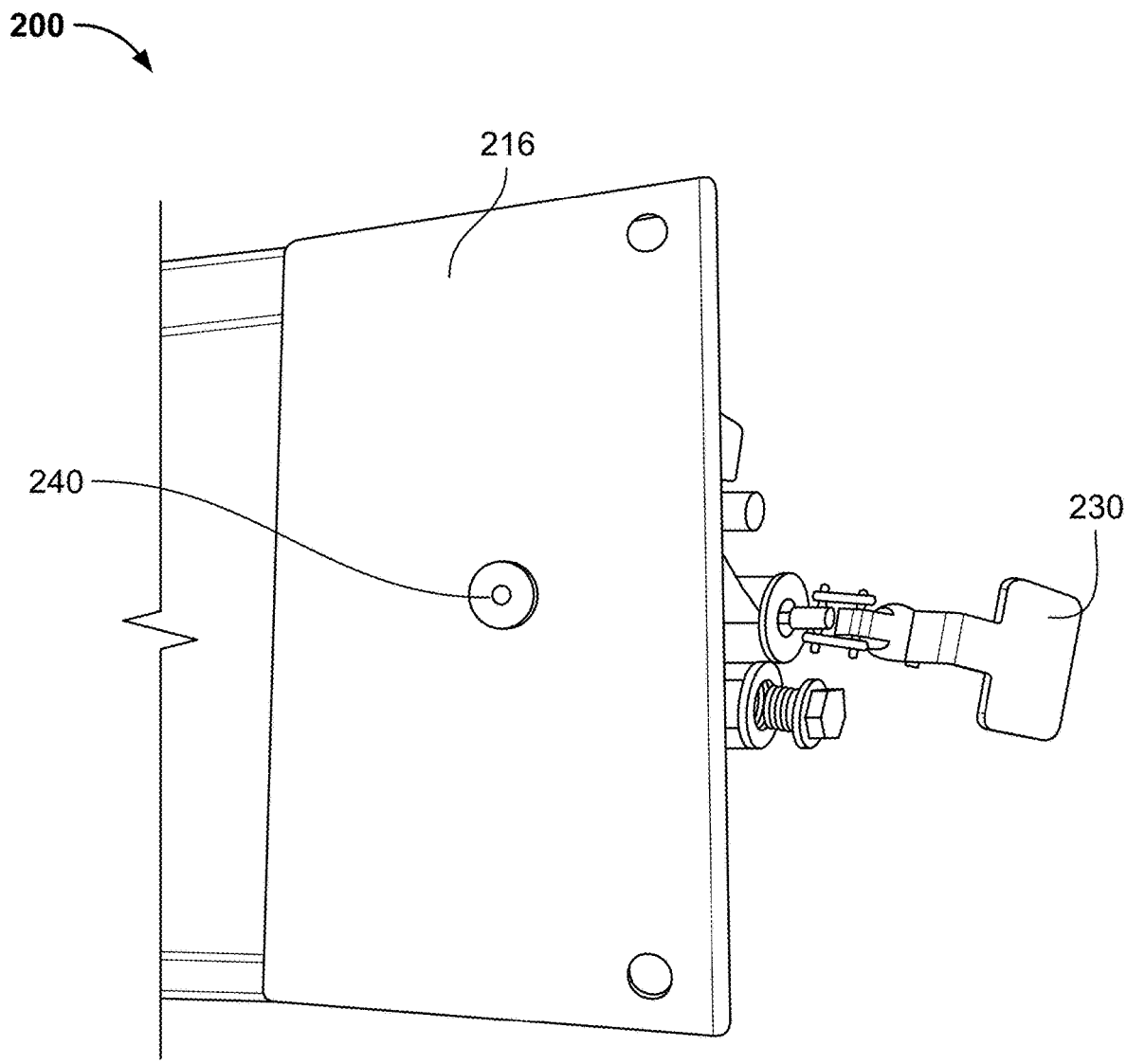
FIG. 12 is partial top perspective view of the automobile flat tire trolley of FIG. 8 and FIG. 9.
Figure 13:
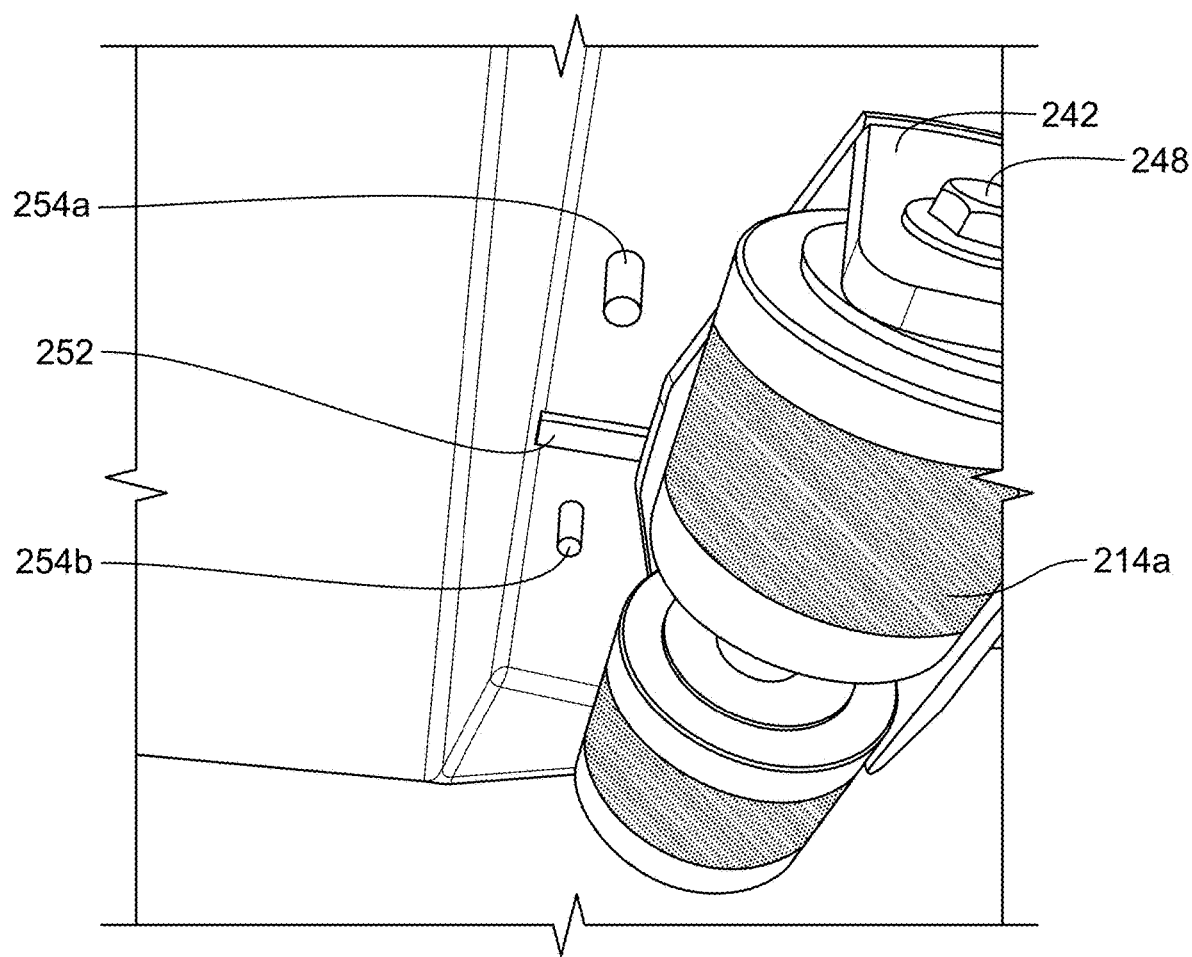
FIG. 13 is partial bottom perspective view of the automobile flat tire trolley of FIG. 8 and FIG. 9, with a tine positioned between two posts.
Figure 14:
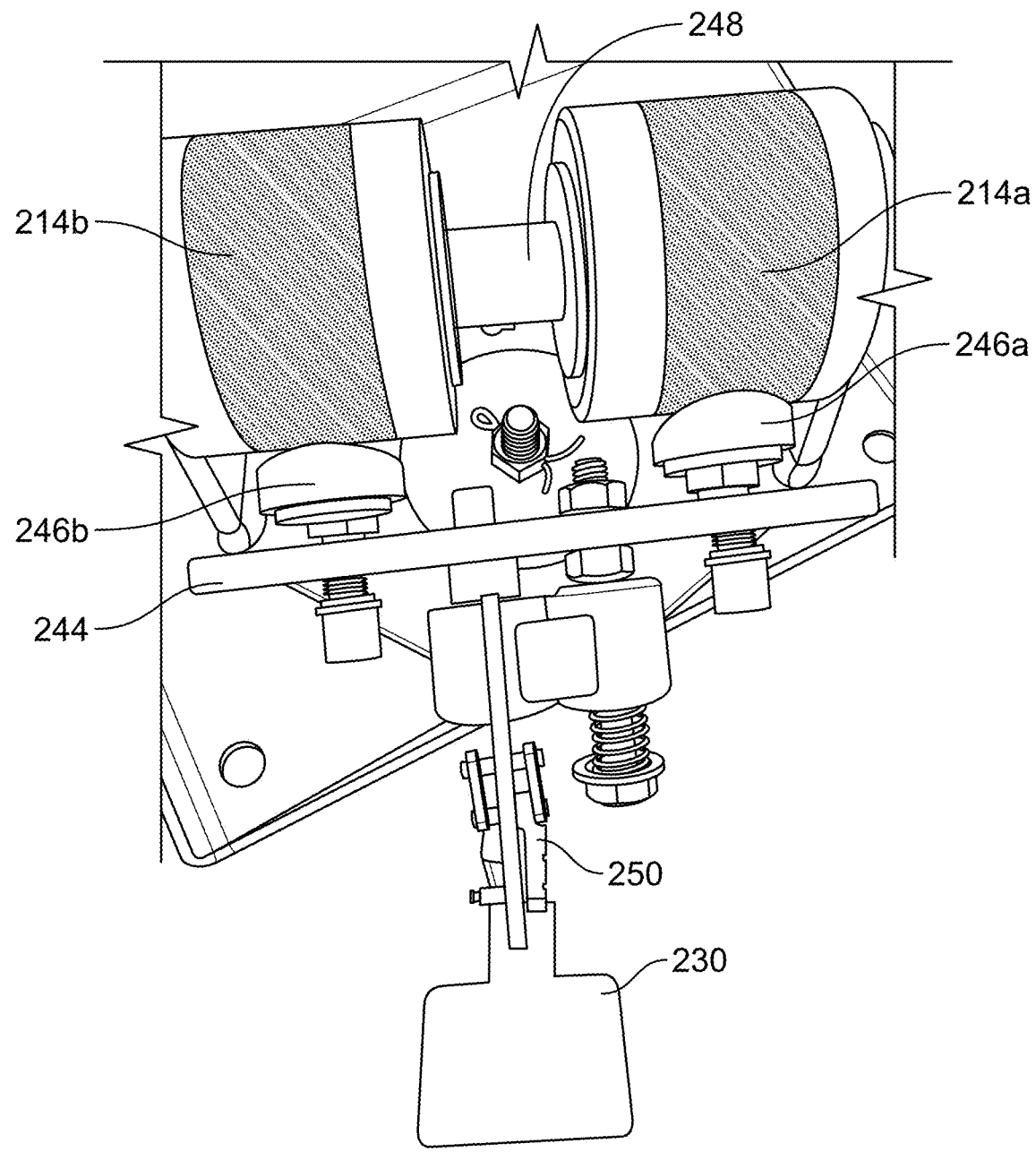
FIG. 14 is a partial bottom perspective view of the automobile flat tire trolley of FIG. 8 and FIG. 9, showing a wheel and brake assembly.
Figure 15:
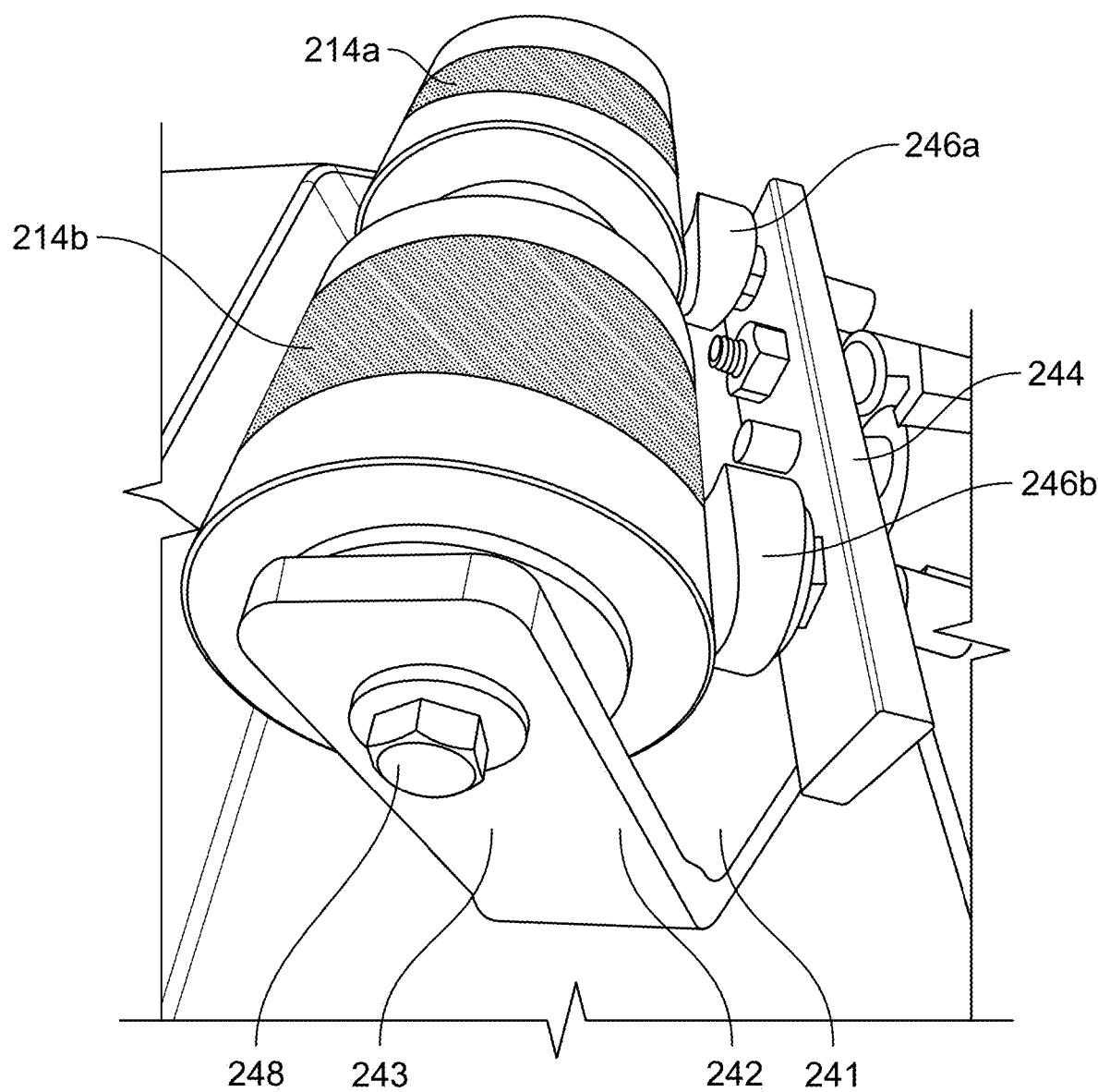
FIG. 15 is a partial side perspective view of the automobile flat tire trolley of FIG. 8 and FIG. 9, showing a wheel and brake assembly.

In various embodiments, the flat tire trolley 200/300 comprises the front wheel assembly 242. In some embodiments, the front wheel assembly 242 comprises a plate 241 that is rotatably coupled to the front deck 216 of the cradle 202, via a fastener 240, as shown in FIGS. 12 and 14. The fastener 240 can be, for example, a bolt and nut, and optionally a cotter pin configured to be inserted through the same. As shown in FIGS. 13-17, the front wheel assembly 242 comprises a pair of arms 243 that project downward from the plate portion 241. The pair of arms 243 are aligned with one another such that a front wheel axle 248 can extend from one arm to the other arm, whereby the front wheel axle 248 passes through the front wheels 214*a*, 214*b*, as shown in FIGS. 13-15. In such embodiments, the plate 241 is substantially flat, which corresponds to the underneath surface of the front deck 216.

In some embodiments, the front wheel assembly 242 comprises a wheel stopper 250. The wheel stopper comprises a lever 230 that can be used to engage or disengage the brake pads 246*a*, 246*b* with and from the front wheels 214*a*, 214*b*, respectively. For example, as shown in FIG. 16, the lever 230 is in a first position that minimizes tension in a spring coupled to a bar 244, which is coupled to the respective brake pads 246*a*, 246*b*. In FIG. 17, by contrast, the lever 230 is in a second position that increases the tension of the spring coupled to the bar 244, which causes the brake pads 246a, 246b to contact the front wheels 214a, 214b. When the lever 230 is in the second position as shown in FIG. 17, the brake pads 246a, 246b prevent the front wheels 214a, 214b from rotating about the front wheel axle 248, and therefore prevents the flat tire trolley 200/300 from moving when a vehicle is being loaded or unloaded onto the trolley.

In some embodiments, the front wheel assembly 242 comprises a tine 252 that projects outward from the plate 241 toward the front wheel abutment 218, as shown in FIG. 13. In such embodiments, the front deck 216 of the cradle 202 comprises a pair of posts 254a, 254b that are spaced apart from one another. The pair of posts 254a, 254b project downward from underneath side of the front deck 216. In some embodiments, the pair of posts 254a, 254b are spaced apart from one another at a distance that will allow the front wheel assembly 242 to rotate about 45 degrees. The pair of posts 254a, 254b restrict the rotation of the front wheel assembly 242 to about 45 degrees, which in turn restricts a wheel attached to the flat tire trolley 200/300 to a rotation of about 45 degrees.

In various embodiments, a kit is provided, the kit comprising the flat tire trolley 100/200/300 and a plurality of straps configured to couple the trolley to a vehicle wheel having a flat tire. For example, as shown in FIG. 3D, the flat tire trolley 100 is coupled to the wheel having the flat tire FT using the rachet straps 500a, 500b. In some embodiments, as shown in FIG. 3D, the flat tire trolley 100 comprises a hook positioned at each corner for coupling the rachet straps 500a, 500b. In some embodiments, as shown in FIGS. 8 and 9, the flat tire trolley 200/300 comprises a through-hole at each corner. In such embodiments, as shown in FIG. 18, the flat tire trolley 200/300 can accommodate S-hooks, such as the hooks shown in the figure attached to the straps 500a, 500b. In some embodiments, the kit further comprises one or more cross-tire straps 510. There can be a plurality of cross-tire straps 510. For example, there can be 2, 3, 4, 5, or 6 cross-tire straps 510. During use, one or more cross-tire straps 510 can be positioned above the axle connected to the vehicle wheel and one or more cross-tire straps 510 can be positioned below the axle. In some embodiments, the combination of the corner-to-corner straps 500a, 500b and a plurality of cross-tire straps 510 provide a secure coupling between the flat tire trolley and the vehicle wheel with the flat tire.

Example. The flat tire trolley 100/200/300 can have a length of about 39-40 inches, a width of about 11 inches, and a height of about 4.5 inches. The width is configured for most tires to fit, and to prevent a flat tire from hanging over the sidewalls of the trolley. The height is configured to fit under the wheel rim and to prevent damage (e.g., by contact with the sidewalls) of the rim during use. The rear ramp 120/220/320 has a length that allows a vehicle wheel to drive onto the cradle without damaging the wheel rim. The first and second plate sections have different lengths starting from the ramp axle to which they are coupled. The longer first plate section 122/222/322 is about 8 inches and the shorter second plate section 126/226/326 is about 5 inches in length. The rear ramp 120/220/320 can be reinforced for additional strength and to resist bending during use, including, for example, having a double thickness. The flat tire trolley 100/200/300 can have through-holes positioned at each of the four perimeter corners for attaching straps. The holes can have a circumference of about 0.5 inches. During use, a plurality of straps are used. For example, six straps can be used in which two straps are ratchet straps that are coupled to the four perimeter through-holes. An additional four endless ratchet straps can be attached from left to right across the wheel. The straps can be about 2 inches wide and have a pressure capacity of at least 1466 pounds. The front and rear wheels must be capable of withstanding the weight of a vehicle on an asphalt surface and resist compression during use. Steel alloy wheels are used because other materials, such as rubber and polyurethane quickly failed during trials on road surfaces. Each of the steel wheels can be sized at 3 inches by 3.5 inches and weighs about 5 pounds. Larger wheels risk damaging the rim of a wheel during use. Each of the steel wheels can be a steel alloy capable of resisting deformation up to about 60,000 pounds of load and resisting failure up to about 110,000 pounds of load during a compression test. The steel wheels have a composition comprising 0.8-1.2% carbon, 0.1-0.7% manganese, 0.1-0.5% silicon, 0.7-1.4% chromium, some trace amounts of other elements, with the remainder being iron.

Example. The flat tire trolley 100/200/300 can be used by a motorist having a vehicle wheel with a flat tire. The method can include a step of positioning the flat tire trolley 100/200/300 in front of the wheel. Next, the levers on the braking assembly are moved so the brake pads are engaged and forcibly contacted with the wheels. Next, with the rear ramp in contact with the underlying ground surface, the vehicle can be driven up onto the cradle. Driving the wheel onto the cradle will cause the ramp to pivot upward, as depicted in FIGS. 3A-3C. Next, the plurality of straps are attached to the flat tire trolley 100/200/300, as shown in FIGS. 3D and 18. The straps should be attached from left to right so that, when driving, the flat tire does not spin and force the straps to come off. As such, the ratchet mechanism should be placed on the left side of the wheel, as shown in FIG. 18, and the strap will go from the left side, around the backside of the wheel, and be grasped from the right side of the wheel before it is inserted into the ratchet mechanism for tightening. Once the wheel is securably coupled to the flat tire trolley 100/200/300, the levers on the braking assembly are moved to disengage the brake pads from the wheels. The vehicle is ready be driven to the destination.

The foregoing embodiments are provided to aid in the understanding of the present disclosure, the true scope of which is set forth in the appended claims. One of skill in the art would appreciate that modifications can be made in the embodiments set forth without departing from the spirit of the disclosure. Exemplary embodiments and examples of the products and methods are described above in detail. The products and methods are not limited to the specific embodiments described herein, but rather, components of the products and methods may be utilized independently and separately from other components described herein. For example, the products may also be used in combination with other products and methods and is not limited to practice with only a product as described herein. Rather, the exemplary embodiment can be implemented and utilized in connection with many other products.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. As used herein, the use of examples, or exemplary language (e.g., "such as"), intended to illuminate the embodiments and does not pose a limitation on the scope of the claims unless otherwise stated. No language in the specification should be construed as indicating any non-claimed element as essential. As used herein, the terms "about" and "substantially" will be understood by persons of ordinary skill in the art and will vary to some extent depending upon the context in which it is used. If there are uses of the term which are not clear to persons of ordinary skill in the art, given the context in which it is used, "about" and "substantially" will mean up to plus or minus 10% of the particular term.

In this description, relational terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship. Furthermore, relational terms, such as "first" and "second," and the like, may be used solely to distinguish one entity or element from another entity or element without necessarily requiring or implying any physical or logical relationship, or order between such entities or elements.

I claim:

1. A flat tire trolley for a vehicle wheel having a flat tire, the flat tire trolley comprising:
   a cradle comprising a bottom support wall, a pair of side walls projecting upward from opposite longitudinal sides of the bottom support wall, a front wheel abutment projecting upward from a front lateral side of the bottom support wall, the front wheel abutment being joined on opposite ends to the pair of side walls, an open rear end having a pivotable ramp secured to the pair of side walls, and a front deck projecting outward from the front wheel abutment, the front deck comprising pair of posts projecting downward from an underside of the front deck, the respective posts being spaced apart from one another;
   a pair of rear wheels coupled to the cradle; and
   a front wheel assembly comprising a plate that is rotatably coupled via a fastener to the underside of the front deck, a pair of arms projecting downward from lateral ends of the plate, a pair of front wheels coupled via a front axle to the pair of arms, and a tine projecting rearward from the plate toward the front wheel abutment;
   wherein the tine projects rearward to a position between the pair of posts such that the front wheel assembly can only be rotated about the fastener between a first position in which the tine contacts a first respective post of the pair of posts and a second position in which the tine contacts a second respective post of the pair of posts.

2. The flat tire trolley of claim 1, wherein the pair of posts are spaced apart at a distance sufficient to restrict the front wheel assembly from rotating more than 60 degrees.

3. The flat tire trolley of claim 1, wherein the pair of posts are spaced apart at a distance sufficient to restrict the front wheel assembly from rotating more than 45 degrees.

4. The flat tire trolley of claim 1, wherein the front wheel assembly further comprises a brake assembly coupled to the plate, the brake assembly comprising a pair of brake pads that are configured and positioned to forcibly contact respective wheels of the pair of front wheels when in an engaging position and to not contact the respective wheels when in a non-engaging position.

5. The flat tire trolley of claim 4, wherein the brake assembly further comprises a lever that is coupled to the pair of brake pads, the lever being configured to move the brake pads from the engaging position to the non-engaging position during use.

6. The flat tire trolley of claim 5, wherein the pair of brake pads and the lever are coupled to a bar that moves the brake pads between the engaging position and the non-engaging position using a spring that is coupled to the lever and the bar.

7. The flat tire trolley of claim 1, wherein each respective wheel of the pair of rear wheels and the pair of front wheels are comprised of a metal alloy that resists deformation in a compression test for loads over 20,000 pounds.

8. The flat tire trolley of claim 1, wherein each respective wheel of the pair of rear wheels and the pair of front wheels are comprised of a metal alloy that resists deformation in a compression test for loads over 50,000 pounds.

9. A kit for a vehicle wheel having a flat tire, comprising:
   a flat tire trolley comprising:
      a cradle comprising a bottom support wall, a pair of side walls projecting upward from opposite longitudinal sides of the bottom support wall, a front wheel abutment projecting upward from a front lateral side of the bottom support wall, the front wheel abutment being joined on opposite ends to the pair of side walls, an open rear end having a pivotable ramp secured to the pair of side walls, and a front deck projecting outward from the front wheel abutment, the front deck comprising pair of posts projecting downward from an underside of the front deck, the respective posts being spaced apart from one another;
      a pair of rear wheels coupled to the cradle; and
      a front wheel assembly comprising a plate that is rotatably coupled via a fastener to an underside of the front deck, a pair of arms projecting downward from lateral ends of the plate, a pair of front wheels coupled via a front axle to the pair of arms, and a tine projecting rearward from the plate toward the front wheel abutment;
      wherein the tine projects rearward to a position between the pair of posts such that the front wheel assembly can only be rotated about the fastener between a first position in which the tine contacts a first respective post of the pair of posts and a second position in which the tine contacts a second respective post of the pair of posts; and
   a plurality of straps for fastening the flat tire trolley to the vehicle wheel having the flat tire.

10. The kit of claim 9, wherein each respective wheel of the pair of rear wheels and the pair of front wheels are comprised of a metal alloy that resists deformation in a compression test for loads over 20,000 pounds.

11. The kit of claim 9, wherein each respective wheel of the pair of rear wheels and the pair of front wheels are comprised of a metal alloy that resists deformation in a compression test for loads over 50,000 pounds.

12. The kit of claim 9, wherein the front wheel assembly further comprises a brake assembly coupled to the plate, the brake assembly comprising a pair of brake pads that are configured and positioned to forcibly contact respective wheels of the pair of front wheels when in an engaging position and to not contact the respective wheels when in a non-engaging position.

13. The kit of claim 12, wherein the brake assembly further comprises a lever that is coupled to the pair of brake pads, the lever being configured to move the brake pads from the engaging position to the non-engaging position during use.

14. The kit of claim 13, wherein the pair of brake pads and the lever are coupled to a bar that moves the brake pads between the engaging position and the non-engaging position using a spring that is coupled to the lever and the bar.

15. The kit of claim 9, wherein the pair of posts are spaced apart at a distance sufficient to restrict the front wheel assembly from rotating more than 60 degrees.

16. The kit of claim 9, wherein the pair of posts are spaced apart at a distance sufficient to restrict the front wheel assembly from rotating more than 45 degrees.

17. The kit of claim 9, wherein the pivotable ramp is secured to the pair of side walls by a ramp axle extending between the pair of side walls.

18. The kit of claim 9, wherein the pair of rear wheels are coupled to an underside of the bottom support wall, in a position proximate to the open rear end.

19. The flat tire trolley of claim 1, wherein the pivotable ramp is secured to the pair of side walls by a ramp axle extending between the pair of side walls.

20. The flat tire trolley of claim 1, wherein the pair of rear wheels are coupled to an underside of the bottom support wall, in a position proximate to the open rear end.

* * * * *